United States Patent
Marshall et al.

(10) Patent No.: US 10,293,298 B2
(45) Date of Patent: May 21, 2019

(54) APPARATUS AND SYSTEM FOR COMBINED TEMPERATURE AND PRESSURE SWING ADSORPTION PROCESSES RELATED THERETO

(71) Applicants: Bennett D. Marshall, Conroe, TX (US); Bruce T. Kelley, Porter, TX (US); Ananda K. Nagavarapu, Houston, TX (US); Harry W. Deckman, Clinton, NJ (US); Robert A. Johnson, Doylestown, PA (US); Shwetha Ramkumar, Cypress, TX (US); Russell H. Oelfke, Houston, TX (US)

(72) Inventors: Bennett D. Marshall, Conroe, TX (US); Bruce T. Kelley, Porter, TX (US); Ananda K. Nagavarapu, Houston, TX (US); Harry W. Deckman, Clinton, NJ (US); Robert A. Johnson, Doylestown, PA (US); Shwetha Ramkumar, Cypress, TX (US); Russell H. Oelfke, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 13 days.

(21) Appl. No.: 15/233,631

(22) Filed: Aug. 10, 2016

(65) Prior Publication Data

US 2017/0056814 A1    Mar. 2, 2017

Related U.S. Application Data

(60) Provisional application No. 62/213,270, filed on Sep. 2, 2015.

(51) Int. Cl.
*B01D 53/047* (2006.01)
*C10L 3/10* (2006.01)
*B01D 53/04* (2006.01)

(52) U.S. Cl.
CPC ....... *B01D 53/0462* (2013.01); *B01D 53/047* (2013.01); *B01D 53/0407* (2013.01);
(Continued)

(58) Field of Classification Search
CPC ........... B01D 53/0462; B01D 53/0407; B01D 53/047; B01D 53/0473; B01D 2253/108;
(Continued)

(56) References Cited

U.S. PATENT DOCUMENTS

| 1,868,138 A | 7/1932 | Fisk |
| 3,103,425 A | 9/1963 | Meyer ............................... 55/62 |

(Continued)

FOREIGN PATENT DOCUMENTS

| CA | 2297590 | 9/2000 |
| CA | 2237103 | 12/2001 |

(Continued)

OTHER PUBLICATIONS

Conviser, S. A. (1964) "Removal of $CO_2$ from Natural Gas With Molecular Sieves," *Proceedings of the Gas Conditioning Conf. Univ. of Oklahoma*, pp. 1F-12F.

(Continued)

*Primary Examiner* — Frank Lawrence
(74) *Attorney, Agent, or Firm* — ExxonMobil Upstream Research Company—Law Department

(57) ABSTRACT

Provided are apparatus and systems for performing a swing adsorption process. This swing adsorption process may involve passing streams through adsorbent bed units to treat the pipeline quality natural gas to form a stream that complies with liquefied natural gas (LNG) specifications.

(Continued)

The process may involve a combined TSA and PSA process, which is utilized to remove contaminants from the feed stream.

25 Claims, 6 Drawing Sheets

(52) U.S. Cl.
CPC .... *B01D 53/0473* (2013.01); *B01D 2253/108* (2013.01); *B01D 2253/116* (2013.01); *B01D 2256/24* (2013.01); *B01D 2256/245* (2013.01); *B01D 2257/304* (2013.01); *B01D 2257/40* (2013.01); *B01D 2257/504* (2013.01); *B01D 2257/80* (2013.01); *B01D 2259/4009* (2013.01); *B01D 2259/40013* (2013.01); *B01D 2259/40043* (2013.01); *B01D 2259/40054* (2013.01); *B01D 2259/4062* (2013.01); *B01D 2259/40086* (2013.01); *B01D 2259/416* (2013.01); *C10L 3/104* (2013.01); *C10L 3/106* (2013.01); *C10L 2290/543* (2013.01); *Y02C 10/08* (2013.01)

(58) Field of Classification Search
CPC .......... B01D 2253/116; B01D 2256/24; B01D 2256/245; B01D 2257/304; B01D 2257/40; B01D 2257/504; B01D 2257/80; B01D 2259/40013; B01D 2259/40043; B01D 2259/40054; B01D 2259/40086; B01D 2259/4009; B01D 2259/4062; B01D 2257/416; Y02C 10/08
USPC ......... 95/96–99, 104–106, 117, 139; 96/121, 96/143, 146; 62/618
See application file for complete search history.

(56) References Cited

U.S. PATENT DOCUMENTS

| | | |
|---|---|---|
| 3,124,152 A | 3/1964 | Payne .................. 137/269.5 |
| 3,142,547 A | 7/1964 | Marsh et al. ................ 55/26 |
| 3,508,758 A | 4/1970 | Strub ........................ 277/15 |
| 3,602,247 A | 8/1971 | Bunn et al. ................ 137/270 |
| 3,788,036 A | 1/1974 | Lee et al. ................... 55/25 |
| 3,967,464 A | 7/1976 | Cormier et al. ............. 62/13 |
| 4,187,092 A | 2/1980 | Woolley ..................... 62/48 |
| 4,261,815 A | 4/1981 | Kelland .................... 209/213 |
| 4,324,565 A | 4/1982 | Benkmann ................. 55/23 |
| 4,325,565 A | 4/1982 | Winchell .................. 280/282 |
| 4,329,162 A | 5/1982 | Pitcher ..................... 55/523 |
| 4,340,398 A | 7/1982 | Doshi et al. ................ 55/25 |
| 4,386,947 A | 6/1983 | Mizuno et al. ............. 55/387 |
| 4,445,441 A | 5/1984 | Tanca ..................... 110/165 |
| 4,461,630 A | 7/1984 | Cassidy et al. ............. 55/25 |
| 4,496,376 A | 1/1985 | Hradek ..................... 55/163 |
| 4,705,627 A | 11/1987 | Miwa et al. ............... 210/264 |
| 4,711,968 A | 12/1987 | Oswald et al. ............ 568/454 |
| 4,737,170 A | 4/1988 | Searle ....................... 55/179 |
| 4,770,676 A | 9/1988 | Sircar et al. ................ 55/26 |
| 4,783,205 A | 11/1988 | Searle ....................... 55/161 |
| 4,784,672 A | 11/1988 | Sircar ........................ 55/26 |
| 4,790,272 A | 12/1988 | Woolenweber ............ 123/188 |
| 4,814,146 A | 3/1989 | Brand et al. ............... 422/179 |
| 4,816,039 A | 3/1989 | Krishnamurthy et al. .... 55/26 |
| 4,877,429 A | 10/1989 | Hunter ..................... 55/162 |
| 4,977,745 A | 12/1990 | Heichberger ............... 62/10 |
| 5,110,328 A | 5/1992 | Yokota et al. ............ 55/180 |
| 5,125,934 A | 6/1992 | Krishnamurthy et al. .... 55/25 |
| 5,169,006 A | 12/1992 | Stelzer ..................... 209/223.1 |
| 5,174,796 A | 12/1992 | Davis et al. ................ 55/26 |
| 5,224,350 A | 7/1993 | Mehra ....................... 62/17 |
| 5,234,472 A | 8/1993 | Krishnamurthy et al. .... 95/98 |
| 5,292,990 A | 3/1994 | Kantner et al. ............ 585/820 |
| 5,306,331 A | 4/1994 | Auvil et al. ................ 95/42 |
| 5,354,346 A | 10/1994 | Kumar ..................... 95/101 |
| 5,365,011 A | 11/1994 | Ramachandran et al. .... 585/829 |
| 5,370,728 A | 12/1994 | LaSala et al. .............. 95/101 |
| 5,486,227 A | 1/1996 | Kumar et al. |
| 5,547,641 A | 8/1996 | Smith et al. ............... 422/181 |
| 5,565,018 A | 10/1996 | Baksh et al. .............. 95/100 |
| 5,672,196 A | 9/1997 | Acharya et al. ............ 95/97 |
| 5,700,310 A | 12/1997 | Bowman et al. ........... 95/45 |
| 5,733,451 A | 3/1998 | Coellner et al. ........... 210/496 |
| 5,735,938 A | 4/1998 | Baksh et al. .............. 95/101 |
| 5,750,026 A | 5/1998 | Gadkaree et al. .......... 201/502.1 |
| 5,769,928 A | 6/1998 | Leavitt |
| 5,792,239 A | 8/1998 | Reinhold, III et al. ....... 95/101 |
| 5,807,423 A | 9/1998 | Lemcoff et al. ............ 95/96 |
| 5,811,616 A | 9/1998 | Holub et al. .............. 585/504 |
| 5,827,358 A | 10/1998 | Kulish et al. .............. 96/115 |
| 5,906,673 A | 5/1999 | Reinhold, III et al. ...... 95/45 |
| 5,912,426 A | 6/1999 | Smolarek et al. |
| 5,924,307 A | 7/1999 | Nenov ...................... 62/643 |
| 5,935,444 A | 8/1999 | Johnson et al. ........... 210/691 |
| 5,968,234 A | 10/1999 | Midgett, II et al. ......... 95/120 |
| 5,976,221 A | 11/1999 | Bowman et al. ........... 95/45 |
| 5,997,617 A | 12/1999 | Czabala et al. ............ 96/130 |
| 6,007,606 A | 12/1999 | Baksh et al. ............... 95/98 |
| 6,011,192 A | 1/2000 | Baker et al. .............. 585/818 |
| 6,023,942 A | 2/2000 | Thomas et al. ............ 62/613 |
| 6,053,966 A | 4/2000 | Moreau et al. ............. 95/96 |
| 6,063,161 A | 5/2000 | Keefer et al. .............. 95/100 |
| 6,096,115 A | 8/2000 | Kleinberg |
| 6,099,621 A | 8/2000 | Ho .......................... 95/139 |
| 6,129,780 A | 10/2000 | Millet et al. ................ 95/117 |
| 6,136,222 A | 10/2000 | Friesen et al. ............. 252/184 |
| 6,147,126 A | 11/2000 | DeGeorge et al. .......... 518/715 |
| 6,152,991 A | 11/2000 | Ackley |
| 6,156,101 A | 12/2000 | Naheiri |
| 6,171,371 B1 | 1/2001 | Derive et al. ............... 95/98 |
| 6,176,897 B1 | 1/2001 | Keefer ....................... 95/98 |
| 6,179,900 B1 | 1/2001 | Behling et al. ............. 95/45 |
| 6,183,538 B1 | 2/2001 | Naheiri |
| 6,194,079 B1 | 2/2001 | Hekal ....................... 428/566 |
| 6,210,466 B1 | 4/2001 | Whysall et al. ............ 95/100 |
| 6,231,302 B1 | 5/2001 | Bonardi .................... 415/105 |
| 6,245,127 B1 | 6/2001 | Kane et al. ................ 95/101 |
| 6,284,021 B1 | 9/2001 | Lu et al. .................... 95/96 |
| 6,311,719 B1 | 11/2001 | Hill et al. .................. 137/312 |
| 6,322,612 B1* | 11/2001 | Sircar ................. B01D 53/047 95/104 |
| 6,345,954 B1 | 2/2002 | Al-Himyary et al. ........ 415/112 |
| 6,398,853 B1 | 6/2002 | Keefer et al. .............. 96/125 |
| 6,402,813 B2 | 6/2002 | Monereau et al. .......... 95/96 |
| 6,406,523 B1 | 6/2002 | Connor et al. ............. 96/125 |
| 6,425,938 B1 | 7/2002 | Xu et al. |
| 6,432,379 B1 | 8/2002 | Heung ..................... 423/648.1 |
| 6,436,171 B1 | 8/2002 | Wang et al. ............... 95/96 |
| 6,444,012 B1 | 9/2002 | Dolan et al. ............... 95/99 |
| 6,444,014 B1 | 9/2002 | Mullhaupt et al. ......... 95/130 |
| 6,444,523 B1 | 9/2002 | Fan et al. .................. 438/257 |
| 6,451,095 B1 | 9/2002 | Keefer et al. .............. 96/125 |
| 6,457,485 B2 | 10/2002 | Hill et al. .................. 137/240 |
| 6,471,939 B1 | 10/2002 | Boix et al. ................. 423/706 |
| 6,488,747 B1 | 12/2002 | Keefer ..................... 96/125 |
| 6,497,750 B2 | 12/2002 | Butwell et al. ............ 95/96 |
| 6,500,234 B1 | 12/2002 | Ackley et al. |
| 6,500,241 B2 | 12/2002 | Reddy ..................... 96/134 |
| 6,500,404 B1 | 12/2002 | Camblor Fernandez et al. .......... 423/706 |
| 6,503,299 B2 | 1/2003 | Baksh et al. ............... 95/98 |
| 6,506,351 B1 | 1/2003 | Jain et al. ................. 423/239.1 |
| 6,514,318 B2 | 2/2003 | Keefer ..................... 95/96 |
| 6,514,319 B2 | 2/2003 | Keefer et al. .............. 95/101 |
| 6,517,609 B1 | 2/2003 | Monereau et al. .......... 95/96 |
| 6,531,516 B2 | 3/2003 | Davis et al. ............... 518/700 |
| 6,533,846 B1 | 3/2003 | Keefer et al. .............. 96/125 |
| 6,565,627 B1 | 5/2003 | Golden et al. ............. 95/96 |
| 6,565,635 B2 | 5/2003 | Keefer et al. .............. 96/125 |
| 6,565,825 B2 | 5/2003 | Ohji et al. ................. 423/625 |
| 6,572,678 B1 | 6/2003 | Wijmans et al. ........... 95/47 |

(56) References Cited

U.S. PATENT DOCUMENTS

| | | |
|---|---|---|
| 6,579,341 B2 | 6/2003 | Baker et al. .................. 95/39 |
| 6,593,541 B1 | 7/2003 | Herren .................. 219/121.67 |
| 6,595,233 B2 | 7/2003 | Pulli .................. 137/115.05 |
| 6,605,136 B1 | 8/2003 | Graham et al. .................. 95/98 |
| 6,607,584 B2 | 8/2003 | Moreau et al. .................. 95/117 |
| 6,630,012 B2 | 10/2003 | Wegeng et al. .................. 95/106 |
| 6,631,626 B1 | 10/2003 | Hahn .................. 62/612 |
| 6,641,645 B1 | 11/2003 | Lee et al. .................. 95/98 |
| 6,651,645 B1 | 11/2003 | Nunez-Suarez .................. 126/9 R |
| 6,660,064 B2 | 12/2003 | Golden et al. .................. 95/96 |
| 6,660,065 B2 | 12/2003 | Byrd et al. .................. 95/117 |
| 6,692,626 B2 | 2/2004 | Keefer et al. .................. 204/491 |
| 6,712,087 B2 | 3/2004 | Hill et al. .................. 137/240 |
| 6,742,507 B2 | 6/2004 | Keefer et al. .................. 123/585 |
| 6,746,515 B2 | 6/2004 | Wegeng et al. .................. 95/96 |
| 6,752,852 B1 | 6/2004 | Jacksier et al. .................. 95/117 |
| 6,770,120 B2 | 8/2004 | Neu et al. .................. 95/96 |
| 6,773,225 B2 | 8/2004 | Yuri et al. .................. 415/1 |
| 6,802,889 B2 | 10/2004 | Graham et al. .................. 95/96 |
| 6,814,771 B2 | 11/2004 | Scardino et al. .................. 55/385.3 |
| 6,835,354 B2 | 12/2004 | Woods et al. .................. 422/139 |
| 6,840,985 B2 | 1/2005 | Keefer .................. 96/125 |
| 6,866,950 B2 | 3/2005 | Connor et al. .................. 429/13 |
| 6,889,710 B2 | 5/2005 | Wagner .................. 137/625.46 |
| 6,890,376 B2 | 5/2005 | Arquin et al. .................. 96/134 |
| 6,893,483 B2 | 5/2005 | Golden et al. .................. 95/96 |
| 6,902,602 B2 | 6/2005 | Keefer et al. .................. 95/97 |
| 6,916,358 B2 | 7/2005 | Nakamura et al. .................. 95/96 |
| 6,918,953 B2 | 7/2005 | Lomax, Jr. et al. .................. 96/130 |
| 6,921,597 B2 | 7/2005 | Keefer et al. .................. 429/34 |
| 6,974,496 B2 | 12/2005 | Wegeng et al. .................. 96/116 |
| 7,025,801 B2 | 4/2006 | Monereau .................. 95/8 |
| 7,027,929 B2 | 4/2006 | Wang .................. 702/17 |
| 7,029,521 B2 | 4/2006 | Johansson .................. 96/128 |
| 7,074,323 B2 | 7/2006 | Ghijsen .................. 208/101 |
| 7,077,891 B2 | 7/2006 | Jaffe et al. .................. 96/108 |
| 7,087,331 B2 | 8/2006 | Keefer et al. .................. 429/17 |
| 7,094,275 B2 | 8/2006 | Keefer et al. .................. 96/125 |
| 7,097,925 B2 | 8/2006 | Keefer et al. .................. 429/9 |
| 7,112,239 B2 | 9/2006 | Kimbara et al. .................. 96/108 |
| 7,117,669 B2 | 10/2006 | Kaboord et al. .................. 60/288 |
| 7,122,073 B1 | 10/2006 | Notaro et al. |
| 7,128,775 B2 | 10/2006 | Celik et al. .................. 95/96 |
| 7,144,016 B2 | 12/2006 | Gozdawa .................. 277/399 |
| 7,160,356 B2 | 1/2007 | Koros et al. .................. 95/50 |
| 7,160,367 B2 | 1/2007 | Babicki et al. .................. 96/116 |
| 7,166,149 B2 | 1/2007 | Dunne et al. .................. 95/113 |
| 7,172,645 B1 | 2/2007 | Pfister et al. .................. 95/116 |
| 7,189,280 B2 | 3/2007 | Alizadeh-Khiavi et al. ... 95/130 |
| 7,250,073 B2 | 7/2007 | Keefer et al. .................. 95/96 |
| 7,250,074 B2 | 7/2007 | Tonkovich et al. .................. 95/130 |
| 7,255,727 B2 | 8/2007 | Monereau et al. .................. 95/96 |
| 7,258,725 B2 | 8/2007 | Ohmi et al. .................. 95/41 |
| 7,276,107 B2 | 10/2007 | Baksh et al. .................. 95/96 |
| 7,279,029 B2 | 10/2007 | Occhialini et al. .................. 96/121 |
| 7,285,350 B2 | 10/2007 | Keefer et al. .................. 429/34 |
| 7,297,279 B2 | 11/2007 | Johnson et al. .................. 210/669 |
| 7,311,763 B2 | 12/2007 | Neary .................. 96/121 |
| RE40,006 E | 1/2008 | Keefer et al. .................. 95/100 |
| 7,314,503 B2 | 1/2008 | Landrum et al. .................. 95/50 |
| 7,354,562 B2 | 4/2008 | Ying et al. .................. 423/437.2 |
| 7,387,849 B2 | 6/2008 | Keefer et al. .................. 429/34 |
| 7,390,350 B2 | 6/2008 | Weist, Jr. et al. .................. 95/100 |
| 7,404,846 B2 | 7/2008 | Golden et al. .................. 95/103 |
| 7,438,079 B2 | 10/2008 | Cohene et al. |
| 7,449,049 B2 | 11/2008 | Thomas et al. .................. 95/123 |
| 7,456,131 B2 | 11/2008 | Klett et al. .................. 502/417 |
| 7,510,601 B2 | 3/2009 | Whitley et al. .................. 96/121 |
| 7,527,670 B2 | 5/2009 | Ackley et al. .................. 95/96 |
| 7,553,568 B2 | 6/2009 | Keefer .................. 429/13 |
| 7,578,864 B2 | 8/2009 | Watanabe et al. .................. 55/523 |
| 7,604,682 B2 | 10/2009 | Seaton .................. 95/96 |
| 7,637,989 B2 | 12/2009 | Bong .................. 96/130 |
| 7,641,716 B2 | 1/2010 | Lomax, Jr. et al. .................. 95/96 |
| 7,645,324 B2 | 1/2010 | Rode et al. .................. 95/96 |
| 7,651,549 B2 | 1/2010 | Whitley .................. 95/96 |
| 7,674,319 B2 | 3/2010 | Lomax, Jr. et al. .................. 95/19 |
| 7,674,539 B2 | 3/2010 | Keefer et al. .................. 429/17 |
| 7,687,044 B2 | 3/2010 | Keefer et al. .................. 422/211 |
| 7,713,333 B2 | 5/2010 | Rege et al. .................. 95/96 |
| 7,717,981 B2 | 5/2010 | LaBuda et al. .................. 95/96 |
| 7,722,700 B2 | 5/2010 | Sprinkle .................. 95/22 |
| 7,731,782 B2 | 6/2010 | Kelley et al. .................. 95/139 |
| 7,740,687 B2 | 6/2010 | Reinhold, III .................. 95/96 |
| 7,744,676 B2 | 6/2010 | Leitmayr et al. .................. 95/99 |
| 7,744,677 B2 | 6/2010 | Barclay et al. .................. 95/114 |
| 7,758,051 B2 | 7/2010 | Roberts-Haritonov et al. .................. 277/401 |
| 7,758,988 B2 | 7/2010 | Keefer et al. .................. 429/34 |
| 7,763,098 B2 | 7/2010 | Alizadeh-Khiavi et al. ..... 95/96 |
| 7,763,099 B2 | 7/2010 | Verma et al. .................. 95/96 |
| 7,792,983 B2 | 9/2010 | Mishra et al. .................. 709/231 |
| 7,793,675 B2 | 9/2010 | Cohen et al. |
| 7,806,965 B2 | 10/2010 | Stinson .................. 95/187 |
| 7,819,948 B2 | 10/2010 | Wagner .................. 95/100 |
| 7,828,877 B2 | 11/2010 | Sawada et al. .................. 95/96 |
| 7,828,880 B2 | 11/2010 | Moriya et al. .................. 95/210 |
| 7,854,793 B2 | 12/2010 | Rarig et al. .................. 96/116 |
| 7,858,169 B2 | 12/2010 | Yamashita .................. 428/116 |
| 7,862,645 B2 | 1/2011 | Whitley et al. .................. 95/96 |
| 7,867,320 B2 | 1/2011 | Baksh et al. .................. 95/96 |
| 7,902,114 B2 | 3/2011 | Bowie et al. |
| 7,938,886 B2 | 5/2011 | Hershkowitz et al. .......... 95/115 |
| 7,947,118 B2 | 5/2011 | Rarig et al. .................. 95/98 |
| 7,947,120 B2 | 5/2011 | Deckman et al. .................. 95/139 |
| 7,959,720 B2 | 6/2011 | Deckman et al. .................. 96/130 |
| 8,016,918 B2 | 9/2011 | LaBuda et al. .................. 95/96 |
| 8,034,164 B2 | 10/2011 | Lomax, Jr. et al. .................. 95/121 |
| 8,071,063 B2 | 12/2011 | Reyes et al. .................. 423/248 |
| 8,128,734 B2 | 3/2012 | Song .................. 95/96 |
| 8,142,745 B2 | 3/2012 | Reyes et al. .................. 423/213.2 |
| 8,142,746 B2 | 3/2012 | Reyes et al. .................. 423/213.2 |
| 8,192,709 B2 | 6/2012 | Reyes et al. .................. 423/245.1 |
| 8,210,772 B2 | 7/2012 | Gillecriosd .................. 405/128.2 |
| 8,227,121 B2 | 7/2012 | Adams et al. .................. 429/429 |
| 8,262,773 B2 | 9/2012 | Northrop et al. .................. 95/114 |
| 8,262,783 B2 | 9/2012 | Stoner et al. .................. 96/108 |
| 8,268,043 B2 | 9/2012 | Celik et al. .................. 95/96 |
| 8,268,044 B2 | 9/2012 | Wright et al. .................. 95/96 |
| 8,272,401 B2 | 9/2012 | McLean .................. 137/625.11 |
| 8,287,629 B2 | 10/2012 | Fujita et al. .................. 96/126 |
| 8,319,090 B2 | 11/2012 | Kitamura .................. 136/244 |
| 8,337,594 B2 | 12/2012 | Corma Canos et al. ........ 95/130 |
| 8,361,200 B2 | 1/2013 | Sayari et al. .................. 95/139 |
| 8,361,205 B2 | 1/2013 | Desai et al. .................. 96/121 |
| 8,377,173 B2 | 2/2013 | Chuang .................. 95/135 |
| 8,444,750 B2 | 5/2013 | Deckman et al. .................. 95/96 |
| 8,470,395 B2 | 6/2013 | Khiavi et al. .................. 427/180 |
| 8,480,795 B2 | 7/2013 | Siskin et al. .................. 95/235 |
| 8,512,569 B2 | 8/2013 | Eaton et al. .................. 210/650 |
| 8,518,356 B2 | 8/2013 | Schaffer et al. .................. 423/220 |
| 8,529,662 B2 | 9/2013 | Kelley et al. .................. 95/96 |
| 8,529,663 B2 | 9/2013 | Reyes et al. .................. 95/96 |
| 8,529,664 B2 | 9/2013 | Deckman et al. .................. 95/96 |
| 8,529,665 B2 | 9/2013 | Manning et al. .................. 95/96 |
| 8,535,414 B2 | 9/2013 | Johnson et al. .................. 95/95 |
| 8,545,602 B2 | 10/2013 | Chance et al. .................. 95/96 |
| 8,551,444 B2 | 10/2013 | Agnihotri et al. .................. 423/648.1 |
| 8,573,124 B2 | 11/2013 | Havran et al. .................. 102/206 |
| 8,591,627 B2 | 11/2013 | Jain .................. 95/52 |
| 8,591,634 B2 | 11/2013 | Winchester et al. ............ 96/127 |
| 8,616,233 B2 | 12/2013 | McLean et al. ......... 137/246.22 |
| 8,657,922 B2 | 2/2014 | Yamawaki et al. .................. 95/96 |
| 8,673,059 B2 | 3/2014 | Leta et al. .................. 95/104 |
| 8,680,344 B2 | 3/2014 | Weston et al. |
| 8,715,617 B2 | 5/2014 | Genkin et al. .................. 423/652 |
| 8,752,390 B2 | 6/2014 | Wright et al. .................. 60/780 |
| 8,778,051 B2 | 7/2014 | Weist, Jr. et al. .................. 95/98 |
| 8,784,533 B2 | 7/2014 | Leta et al. .................. 95/97 |
| 8,784,534 B2 | 7/2014 | Kamakoti et al. .................. 95/97 |
| 8,784,535 B2 | 7/2014 | Ravikovitch et al. .......... 95/98 |
| 8,795,411 B2 | 8/2014 | Hufton et al. .................. 95/90 |
| 8,808,425 B2 | 8/2014 | Genkin et al. .................. 95/96 |
| 8,808,426 B2 | 8/2014 | Sundaram .................. 95/96 |

(56) References Cited

U.S. PATENT DOCUMENTS

| | | |
|---|---|---|
| 8,814,985 B2 | 8/2014 | Gerds et al. .................. 95/90 |
| 8,852,322 B2 | 10/2014 | Gupta et al. .................. 95/136 |
| 8,858,683 B2 | 10/2014 | Deckman ...................... 95/96 |
| 8,875,483 B2 | 11/2014 | Wettstein ................... 60/39.52 |
| 8,906,138 B2 | 12/2014 | Rasmussen et al. ............. 95/96 |
| 8,921,637 B2 | 12/2014 | Sundaram et al. ........... 585/823 |
| 8,939,014 B2 | 1/2015 | Kamakoti et al. .............. 73/38 |
| 8,940,263 B2 * | 1/2015 | Golden ............... B01D 53/864 |
| | | 423/247 |
| 9,005,561 B2 | 4/2015 | Leta |
| 9,017,457 B2 | 4/2015 | Tammera ...................... 95/96 |
| 9,028,595 B2 | 5/2015 | Narasimhan et al. |
| 9,034,078 B2 | 5/2015 | Wanni et al. ..................... 95/8 |
| 9,034,079 B2 | 5/2015 | Deckman et al. ................ 95/96 |
| 9,050,553 B2 | 6/2015 | Alizadeh-Khiavi et al. |
| 9,067,168 B2 | 6/2015 | Frederick et al. .............. 96/108 |
| 9,095,809 B2 | 8/2015 | Deckman et al. ................ 95/45 |
| 9,108,145 B2 | 8/2015 | Kalbassi et al. ................... 95/8 |
| 9,120,049 B2 | 9/2015 | Sundaram et al. .............. 96/121 |
| 9,126,138 B2 | 9/2015 | Deckman et al. ................ 95/95 |
| 9,162,175 B2 | 10/2015 | Sundaram ..................... 96/121 |
| 9,168,485 B2 | 10/2015 | Deckman et al. ................ 95/96 |
| 2001/0047824 A1 | 12/2001 | Hill et al. .................... 137/312 |
| 2002/0053547 A1 | 5/2002 | Schlegel et al. |
| 2002/0124885 A1 | 9/2002 | Hill et al. .................... 137/312 |
| 2002/0162452 A1 | 11/2002 | Butwell et al. ................... 95/96 |
| 2003/0075485 A1 | 4/2003 | Ghijsen ....................... 208/340 |
| 2003/0129101 A1 | 7/2003 | Zettel ......................... 422/179 |
| 2003/0131728 A1 | 7/2003 | Kanazirev et al. ............... 95/96 |
| 2003/0170527 A1 | 9/2003 | Finn et al. ..................... 429/34 |
| 2003/0202918 A1 | 10/2003 | Ashida et al. ................ 422/180 |
| 2003/0205130 A1 | 11/2003 | Neu et al. ....................... 95/90 |
| 2003/0223856 A1 | 12/2003 | Yuri et al. ....................... 415/1 |
| 2004/0099142 A1 | 5/2004 | Arquin et al. .................. 96/134 |
| 2004/0118277 A1 | 6/2004 | Kim |
| 2004/0197596 A1 | 10/2004 | Connor et al. ................ 428/630 |
| 2004/0232622 A1 | 11/2004 | Gozdawa ..................... 277/401 |
| 2005/0014511 A1 | 1/2005 | Spain .......................... 96/124 |
| 2005/0109419 A1 | 5/2005 | Ohmi et al. ..................... 141/4 |
| 2005/0114032 A1 | 5/2005 | Wang ........................... 702/14 |
| 2005/0129952 A1 | 6/2005 | Sawada et al. ................ 428/409 |
| 2005/0145111 A1 | 7/2005 | Keefer et al. ................. 96/124 |
| 2005/0150378 A1 | 7/2005 | Dunne et al. .................. 95/113 |
| 2005/0229782 A1 | 10/2005 | Monereau et al. ............... 95/96 |
| 2005/0252378 A1 | 11/2005 | Celik et al. ................... 96/121 |
| 2006/0048648 A1 | 3/2006 | Gibbs et al. ................... 96/108 |
| 2006/0049102 A1 | 3/2006 | Miller et al. ............. 210/500.27 |
| 2006/0076270 A1 | 4/2006 | Poshusta et al. .............. 208/208 |
| 2006/0099096 A1 | 5/2006 | Shaffer et al. ................. 418/55.1 |
| 2006/0105158 A1 | 5/2006 | Fritz et al. ................... 428/317.9 |
| 2006/0162556 A1 | 7/2006 | Ackley et al. .................. 95/96 |
| 2006/0165574 A1 | 7/2006 | Sayari ......................... 423/210 |
| 2006/0169142 A1 | 8/2006 | Rode et al. ................... 96/129 |
| 2006/0236862 A1 | 10/2006 | Golden et al. .................. 95/96 |
| 2007/0084241 A1 | 4/2007 | Kretchmer et al. ............. 63/29.2 |
| 2007/0084344 A1 | 4/2007 | Moriya et al. ................ 95/210 |
| 2007/0222160 A1 | 9/2007 | Roberts-Haritonov et al. .......... |
| | | 277/387 |
| 2007/0253872 A1 | 11/2007 | Keefer et al. ................. 422/143 |
| 2007/0261550 A1 | 11/2007 | Ota |
| 2007/0261557 A1 | 11/2007 | Gadkaree et al. .............. 96/121 |
| 2007/0283807 A1 | 12/2007 | Whitley ........................ 95/96 |
| 2008/0051279 A1 | 2/2008 | Klett et al. .................... 502/60 |
| 2008/0072822 A1 | 3/2008 | White ......................... 118/722 |
| 2008/0128655 A1 | 6/2008 | Garg et al. ................... 252/373 |
| 2008/0282883 A1 | 11/2008 | Rarig et al. .................... 95/96 |
| 2008/0282884 A1 | 11/2008 | Kelley et al. ................... 95/96 |
| 2008/0282885 A1 | 11/2008 | Deckman et al. ................ 95/98 |
| 2008/0282886 A1 | 11/2008 | Reyes et al. .................... 95/96 |
| 2008/0282887 A1 | 11/2008 | Chance ......................... 95/98 |
| 2008/0282892 A1 | 11/2008 | Deckman et al. .............. 96/140 |
| 2008/0289497 A1 | 11/2008 | Barclay et al. ................. 95/114 |
| 2008/0307966 A1 | 12/2008 | Stinson ........................ 95/187 |
| 2008/0314550 A1 | 12/2008 | Greco ............................. 165/4 |
| 2009/0004073 A1 | 1/2009 | Gleize et al. .................. 422/180 |
| 2009/0014902 A1 | 1/2009 | Koivunen et al. ............... 265/11 |
| 2009/0025553 A1 | 1/2009 | Keefer et al. ................... 95/96 |
| 2009/0025555 A1 | 1/2009 | Lively et al. |
| 2009/0037550 A1 | 2/2009 | Mishra et al. ................ 708/208 |
| 2009/0071333 A1 | 3/2009 | LaBuda et al. .................. 95/96 |
| 2009/0079870 A1 | 3/2009 | Matsui .......................... 348/558 |
| 2009/0107332 A1 | 4/2009 | Wagner ......................... 95/100 |
| 2009/0151559 A1 | 6/2009 | Verma et al. .................... 95/96 |
| 2009/0162268 A1 | 6/2009 | Hufton et al. ................. 423/210 |
| 2009/0180423 A1 | 7/2009 | Kroener ....................... 370/328 |
| 2009/0241771 A1 | 10/2009 | Manning et al. ................ 95/15 |
| 2009/0284013 A1 | 11/2009 | Anand et al. ................... 290/52 |
| 2009/0294366 A1 | 12/2009 | Wright et al. |
| 2009/0308248 A1 | 12/2009 | Siskin et al. ................... 95/236 |
| 2009/0314159 A1 | 12/2009 | Haggerty ........................ 95/90 |
| 2010/0059701 A1 | 3/2010 | McLean ....................... 251/304 |
| 2010/0077920 A1 | 4/2010 | Baksh et al. .................... 95/97 |
| 2010/0089241 A1 | 4/2010 | Stoner et al. ................... 96/125 |
| 2010/0186445 A1 | 7/2010 | Minta et al. .................... 62/606 |
| 2010/0212493 A1 | 8/2010 | Rasmussen et al. ............. 95/45 |
| 2010/0251887 A1 | 10/2010 | Jain ............................... 95/46 |
| 2010/0252497 A1 | 10/2010 | Ellison et al. ............. 210/500.1 |
| 2010/0263534 A1 | 10/2010 | Chuang ........................ 95/139 |
| 2010/0282593 A1 | 11/2010 | Speirs et al. .................... 203/11 |
| 2010/0288704 A1 | 11/2010 | Amsden et al. ............... 210/688 |
| 2011/0011803 A1 | 1/2011 | Koros |
| 2011/0031103 A1 | 2/2011 | Deckman et al. ............... 203/41 |
| 2011/0067440 A1 | 3/2011 | Van Aken ...................... 62/613 |
| 2011/0067770 A1 | 3/2011 | Pederson et al. ........ 137/625.15 |
| 2011/0146494 A1 | 6/2011 | Desai et al. .................... 96/115 |
| 2011/0217218 A1 | 9/2011 | Gupta et al. .................. 423/228 |
| 2011/0277620 A1 | 11/2011 | Havran et al. ................. 89/1.14 |
| 2011/0291051 A1 | 12/2011 | Hershkowitz et al. ....... 252/373 |
| 2011/0296871 A1 | 12/2011 | Van Soest-Vercammen et al. ...... |
| | | 62/636 |
| 2011/0308524 A1 | 12/2011 | Brey et al. ................ 128/205.12 |
| 2012/0024152 A1 | 2/2012 | Yamawaki et al. .............. 95/96 |
| 2012/0031144 A1 | 2/2012 | Northrop et al. ............... 62/617 |
| 2012/0067216 A1 | 3/2012 | Corma-Canos et al. ......... 95/95 |
| 2012/0152115 A1 | 6/2012 | Gerds et al. .................... 95/90 |
| 2012/0222551 A1 | 9/2012 | Deckman ........................ 95/96 |
| 2012/0222552 A1 | 9/2012 | Ravikovitch et al. ............ 95/97 |
| 2012/0222553 A1 | 9/2012 | Kamakoti et al. ................ 95/99 |
| 2012/0222554 A1 | 9/2012 | Leta et al. ..................... 95/104 |
| 2012/0222555 A1 | 9/2012 | Gupta et al. .................... 95/136 |
| 2012/0255377 A1 | 10/2012 | Kamakoti et al. ......... 73/863.23 |
| 2012/0308456 A1 | 12/2012 | Leta et al. .................... 423/228 |
| 2012/0312163 A1 | 12/2012 | Leta et al. ...................... 95/97 |
| 2013/0061755 A1 | 3/2013 | Frederick et al. .............. 96/110 |
| 2013/0225898 A1 | 8/2013 | Sundaram et al. ............. 585/802 |
| 2014/0013955 A1 | 1/2014 | Tammera et al. .............. 96/115 |
| 2014/0060326 A1 | 3/2014 | Sundaram et al. ............... 95/96 |
| 2014/0083294 A1 | 3/2014 | Carrier et al. |
| 2014/0157986 A1 | 6/2014 | Ravikovitch et al. ............ 95/96 |
| 2014/0208797 A1 | 7/2014 | Kelley et al. ................... 62/611 |
| 2014/0216254 A1 | 8/2014 | Tammera et al. ............... 95/114 |
| 2014/0338425 A1 * | 11/2014 | Kalbassi ............... B01D 53/047 |
| | | 73/31.07 |
| 2015/0013377 A1 | 1/2015 | Oelfke |
| 2015/0068397 A1 | 3/2015 | Boulet et al. |
| 2015/0196870 A1 | 7/2015 | Albright et al. |

FOREIGN PATENT DOCUMENTS

| | | |
|---|---|---|
| EP | 0257493 | 2/1988 |
| EP | 0426937 | 5/1991 |
| EP | 1018359 | 7/2000 |
| EP | 1577561 | 9/2005 |
| EP | 1674555 | 6/2006 |
| EP | 2823872 | 1/2015 |
| FR | 2924951 | 6/2009 |
| JP | 58-114715 | 7/1983 |
| JP | 59-232174 | 12/1984 |
| JP | 60-189318 | 12/1985 |
| JP | 2002-253818 | 10/1990 |
| JP | 04-180978 | 6/1992 |
| JP | 2011-169640 | 6/1999 |
| JP | 2011-280921 | 10/1999 |
| JP | 2000-024445 | 8/2001 |

(56) References Cited

FOREIGN PATENT DOCUMENTS

| JP | 2002-348651 | 12/2002 |
|---|---|---|
| JP | 2006-016470 | 1/2006 |
| JP | 2006-036849 | 2/2006 |
| JP | 2008-272534 | 11/2008 |
| WO | WO2002/024309 | 3/2002 |
| WO | WO2002/073728 | 9/2002 |
| WO | WO2005/090793 | 9/2005 |
| WO | WO2011/139894 | 11/2011 |

OTHER PUBLICATIONS

ExxonMobil Research and Engineering and Xebec (2008) RCPSA-Rapid Cycle Pressure Swing Adsorption—An Advanced, Low-Cost Commercialized H2 Recovery Process, *Brochure*, 2 pages.

ExxonMobil Research and Engineering and QuestAir (2008) "A New Commercialized Process for Lower Cost H2 Recovery—Rapid Cycle Pressure Swing Adsorption (RCPSA)," *Brochure*, 4 pgs.

Farooq, S. et al. (1990) "Continuous Contercurrent Flow Model for a Bulk PSA Separation Process," *AIChE J.*, v36 (2) p. 310-314.

FlowServe (2005)"Exceeding Expectations, US Navy Cuts Maintenance Costs With Flowserve GX-200 Non-Contacting Seal Retrofits," *Face-to-Face*, v17.1, 8 pgs.

GE Oil & Gas (2007) "Dry Gas Seal Retrofit," Florene, Italy, www.ge.com/oilandgas, 4 pgs.

Hopper, B. et al. (2008) "World's First 10,000 psi Sour Gas Injection Compressor," *Proceedings of the 37th Turbomachinery Symosium*, pp. 73-95.

Kikkinides, E. S. et al. (1995) "Natural Gas Desulfurization by Adsorption: Feasibility and Multiplicity of Cyclic Steady States," *Ind. Eng. Chem. Res.* V. 34, pp. 255-262.

Rameshni, Mahin (May 19, 2007) "Strategies for Sour Gas Field Developments," *Worley Parsons-Brochure*, 20 pgs.

Reyes, S. C. et al. (1997) "Frequency Modulation Methods for Diffusion and Adsorption Measurements in Porous Solids," *J. Phys. Chem. B.* v101, pp. 614-622.

Ruthven, D. M. et al. (1996) "Performance of a Parallel Passage Adsorbent Contactor," *Gas. Sep. Purif.*, vol. 10, No. 1, pp. 63-73.

Stahley, J. S. (2003) "Design, Operation, and Maintenance Considerations for Improved Dry Gas Seal Realiability in Centrifugal Compressors," *Dresser-Rand, Tech. Paper 134*, 15 pages.

Suzuki, M. (1985) "Continuous-Countercurrent-Flow Approximation for Dynamic Steady State Profile of Pressure Swing Adsorption" *AIChE Symp. Ser.* v81 (242) pp. 67-73.

\* cited by examiner

APPARATUS AND SYSTEM FOR COMBINED TEMPERATURE AND PRESSURE SWING ADSORPTION PROCESSES RELATED THERETO

CROSS REFERENCE TO RELATED APPLICATIONS

This application claims the benefit of U.S. Provisional Application No. 62/213,270 filed Sep. 2, 2015, entitled "Apparatus and System for Combined Temperature and Pressure Swing Adsorption Processes Related Thereto", the entirety of which is incorporated herein by reference.

Additionally, it is noted that this application is related to U.S. Provisional Application No. 62/213,262 filed Sep. 2, 2015, entitled "Apparatus and System for Swing Adsorption Processes Related Thereto;" U.S. Provisional Application No. 62/213,267 filed Sep. 2, 2015, entitled "Apparatus and System for Swing Adsorption Processes Related Thereto" and U.S. Provisional Application No. 62/213,273 filed Sep. 2, 2015, entitled "Apparatus and System for Swing Adsorption Processes Related Thereto."

FIELD

The present techniques relate to a system associated with a combined temperature swing adsorption (TSA) and pressure swing adsorption (PSA) process. In particular, the system includes a combined TSA and PSA process for treating of pipeline quality natural gas to liquefied natural gas (LNG) specifications.

BACKGROUND

Gas separation is useful in many industries and can typically be accomplished by flowing a mixture of gases over an adsorbent material that preferentially adsorbs one or more gas components while not adsorbing one or more other gas components. The non-adsorbed components are recovered as a separate product.

One particular type of gas separation technology is swing adsorption, such as temperature swing adsorption (TSA), pressure swing adsorption (PSA), partial pressure swing adsorption (PPSA), rapid cycle temperature swing adsorption (RCTSA), rapid cycle pressure swing adsorption (RCPSA), rapid cycle partial pressure swing adsorption (RCPPSA), and not limited to but also combinations of the fore mentioned processes, such as pressure and temperature swing adsorption. As an example, PSA processes rely on the phenomenon of gases being more readily adsorbed within the pore structure or free volume of an adsorbent material when the gas is under pressure. That is, the higher the gas pressure, the greater the amount of readily-adsorbed gas adsorbed. When the pressure is reduced, the adsorbed component is released, or desorbed from the adsorbent material.

The swing adsorption processes (e.g., PSA and/or TSA) may be used to separate gases of a gas mixture because different gases tend to fill the micropore of the adsorbent material to different extents. For example, if a gas mixture, such as natural gas, is passed under pressure through a vessel containing an adsorbent material that is more selective towards carbon dioxide than it is for methane, at least a portion of the carbon dioxide is selectively adsorbed by the adsorbent material, and the gas exiting the vessel is enriched in methane. When the adsorbent material reaches the end of its capacity to adsorb carbon dioxide, it is regenerated by reducing the pressure, thereby releasing the adsorbed carbon dioxide. Then, the adsorbent material is typically purged and repressurized prior to starting another adsorption cycle.

The swing adsorption processes typically involve adsorbent bed units, which include adsorbent beds disposed within a housing and configured to maintain fluids at various pressures for different steps in a cycle within the unit. These adsorbent bed units utilize different packing material in the bed structures. For example, the adsorbent bed units utilize checker brick, pebble beds or other available packing. As an enhancement, some adsorbent bed units may utilize engineered packing within the bed structure. The engineered packing may include a material provided in a specific configuration, such as a honeycomb, ceramic forms or the like.

Further, various adsorbent bed units may be coupled together with conduits and valves to manage the flow of fluids through the cycle. Orchestrating these adsorbent bed units involves coordinating the steps in the cycle for each of the adsorbent bed units with other adsorbent bed units in the system. A complete cycle can vary from seconds to minutes as it transfers a plurality of gaseous streams through one or more of the adsorbent bed units.

Conventional processes are used to treat hydrocarbon containing streams containing $CO_2$ to prepare the stream for LNG specifications. For example, a typical LNG specification requires the $CO_2$ content to be less than 50 parts per million molar (ppm). Such stringent specifications are not applied on natural gas streams in typical pipeline networks. For example, the $CO_2$ content for pipeline gas in a pipeline stream can be as high as 2% by volume. As such, for LNG facilities that use the pipeline gas as the raw feed, additional treatment steps may be necessary. For gas containing less than a few hundred ppm of $CO_2$, a conventional pressure or temperature swing adsorption process may be used. However, as the $CO_2$ content in the gas stream increases, this process becomes economically unviable. For gas containing higher amounts of $CO_2$, an amine-solvent based separation system is commonly used. Such amine-solvent based separation systems have large foot print and weight, and involve large capital investments. Additionally, these systems involve the use of solvents, which have to be replenished as part of the process. Furthermore, the process requires a large molecular sieve unit to dehydrate the gas downstream of the amine separation system, as the gas is at water saturation conditions.

Unfortunately, conventional processes for processing LNG streams have certain limitations. With LNG operations, the size and weight of the conventional system may be problematic, which is further compounded for floating facilities. The excessive weight and footprint for conventional systems add to the complexity of the floating facility and increase the size of the facilities. Also, the additional size and complexity increase the capital investment costs along with the operating costs for the floating facilities. Further, as conventional processes use of solvents or other such materials that require frequent replenishment, the operating costs and complexity are increased. This aspect is further compounded if the floating facilities is remotely located and is difficult to access and resupply.

Accordingly, there remains a need in the industry for apparatus, methods, and systems that provided enhancements to the processing of feed streams into a LNG system. Further, a need exists for a reduction in cost, size, and weight of facilities for treatment of pipeline quality streams prior to liquefaction, which may be provided to a LNG system that has to comply with LNG specifications.

SUMMARY OF THE INVENTION

In one or more embodiments, the present techniques comprise a process for removing contaminants from a gaseous feed stream, the process comprising: a) performing one or more adsorption steps, wherein each of the one or more adsorption steps comprise passing a gaseous feed stream through an adsorbent bed unit having an adsorbent bed to separate one or more contaminants from the gaseous feed stream to form a product stream; b) performing one or more depressurization steps, wherein the pressure within the adsorbent bed unit is reduced by a predetermined amount with each successive depressurization step; c) performing a heating step, wherein the heating step comprises passing a heating stream at a heating temperature into the adsorbent bed unit, wherein the heating stream is passed in a countercurrent direction relative to the direction of the feed stream and the heating temperature is less than 500° F. (260° C.) (e.g., which may heat only a portion of the bed; d) performing a purge step, wherein the purge step comprises passing a purge stream into the adsorbent bed unit, wherein the purge stream is passed in a countercurrent direction relative to the direction of the feed stream and wherein a temperature differential exists at the end of the purge step in a range between 50° F. (27.8° C.) and 400° F. (222.2° C.) (or a range between 100° F. (55.6° C.) and 400° F. (222.2° C.), wherein the temperature differential is the difference in temperatures between a feed end of the adsorbent bed and a product end of the adsorbent bed; and e) repeating the steps a) to d) for at least one additional cycle, wherein the cycle duration is for a period greater than 1 second and less than 600 seconds. The temperature differential is in a range between 125° F. (69.4° C.) and 350° F. (194.4° C.) or in a range between 175° F. (97.2° C.) and 300° F. (166.7° C.).

In yet another embodiment, a system for removing contaminants from a gaseous feed stream is described. The system comprising: an adsorbent bed unit, a liquefied natural gas process unit, one or more purge units and a heating mechanism. The adsorbent bed unit is configured to separate contaminants from a gaseous feed stream and to output a product stream, wherein the adsorbent bed unit comprises an adsorbent bed, while the liquefied natural gas process unit is in fluid communication with the adsorbent bed unit and is configured to receive the product stream and separate the product stream into a final product stream and a flash fuel stream. The one or more purge units are in fluid communication with the liquefied natural gas process unit and configured to provide a purge stream to the adsorbent bed unit, wherein the purge stream is provided from one of a portion of the product stream, the flash fuel stream, a boil off gas stream and any combination thereof. The heating mechanism is in fluid communication with the adsorbent bed unit and is configured to: pass a heating stream at a heating temperature into the adsorbent bed unit, wherein the heating stream is configured to create a temperature differential in a range between 50° F. (27.8° C.) and 400° F. (222.2° C.), wherein the temperature differential is the difference in temperatures between a feed end of the adsorbent bed and a product end of the adsorbent bed; and combine a portion of the heating stream with the purge stream that is passed through the adsorbent bed unit. The heating mechanism may be a heating loop. The one or more purge units may comprise one or more compressors configured to compress one of the flash fuel stream, a boil off gas stream and any combination thereof.

BRIEF DESCRIPTION OF THE FIGURES

The foregoing and other advantages of the present disclosure may become apparent upon reviewing the following detailed description and drawings of non-limiting examples of embodiments.

DETAILED DESCRIPTION OF THE INVENTION

Figure 1:
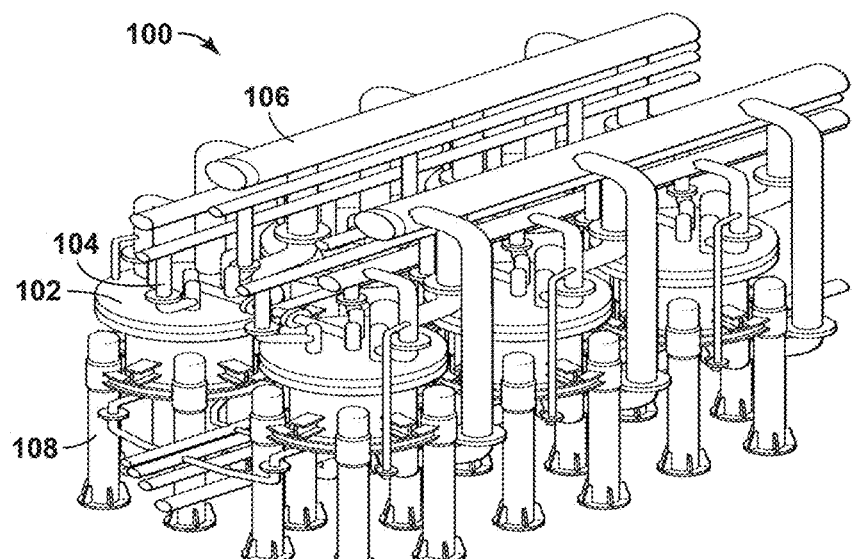
FIG. 1 is a three-dimensional diagram of the swing adsorption system with six adsorbent bed units and interconnecting piping in accordance with an embodiment of the present techniques.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

As used herein, "stream" refers to fluid (e.g., solids, liquid and/or gas) being conducted through various equipment. The equipment may include conduits, vessels, manifolds, units or other suitable devices.

As used herein, volume percentage is based on standard conditions. The standard conditions for a method may be normalized to the temperature of 0° C. (e.g., 32° F.) and absolute pressure of 100 kiloPascals (kPa) (1 bar).

As used herein, "conduit" refers to a tubular member forming a channel through which something is conveyed. The conduit may include one or more of a pipe, a manifold, a tube or the like.

The provided processes, apparatus, and systems of the present techniques may be used to remove contaminants ($CO_2$, $H_2O$, and $H_2S$) from feed streams, such as hydrocarbon containing streams. As may be appreciated and as noted above, the hydrocarbon containing feed streams may have different compositions. For example, hydrocarbon feed streams vary widely in amount of acid gas, such as from several parts per million acid gas to 90 volume percent (vol. %) acid gas. Non-limiting examples of acid gas concentrations from exemplary gas reserves sources include concentrations of approximately: (a) 4 ppm $H_2S$, 2 vol. % $CO_2$, 100 ppm $H_2O$ (b) 4 ppm $H_2S$, 0.5 vol. % $CO_2$, 200 ppm $H_2O$ (c) 1 vol. % $H_2S$, 2 vol. % $CO_2$, 150 ppm $H_2O$, (d) 4 ppm $H_2S$, 2 vol. % $CO_2$, 500 ppm $H_2O$, and (e) 1 vol. % $H_2S$, 5 vol. % $CO_2$, 500 ppm $H_2O$. Further, in certain applications the hydrocarbon containing stream may include predominately hydrocarbons with specific amounts of $CO_2$ and/or water. For example, the hydrocarbon containing stream may have greater than 0.00005 volume percent $CO_2$ based on the total volume of the gaseous feed stream and less than 2 volume percent $CO_2$ based on the total volume of the gaseous feed stream; or less than 10 volume percent $CO_2$ based on the total volume of the gaseous feed stream. The processing of feed streams may be more problematic when certain specifications have to be satisfied. Accordingly, the present techniques provide configurations and processes that are utilized to enhance the separation of contaminants from a feed stream to form a liquefied natural gas (LNG) stream that complies with LNG specifications. For example, natural gas feed streams for liquefied natural gas (LNG) applications have stringent specifications on the $CO_2$ content to ensure against formation of solid $CO_2$ at cryogenic temperatures. The LNG specifications may involve the $CO_2$ content to be less than or equal to 50 ppm. Such specifications are not applied on natural gas streams in pipeline networks, which may involve the $CO_2$ content up to 2 vol. % based on the total volume of the gaseous feed stream. As such, for LNG facilities that use the pipeline gas (e.g., natural gas) as the raw feed, additional treating or processing steps are utilized to further purify the stream. Further, the present techniques may be used to lower the water content of the stream to less than 0.1 ppm.

The product stream, which may be the LNG feed stream, may have greater than 98 volume percent hydrocarbons based on the total volume of the product stream, while the $CO_2$ and water content are below certain thresholds. The LNG specifications may involve the $CO_2$ content to be less than or equal to 100 ppm or preferably less than or equal to 50 ppm, while the water content of the stream may be less than 0.1 ppm.

In certain embodiments, the system utilizes a combined swing adsorption process, which combines TSA and PSA, for treating of pipeline quality natural gas to remove contaminants for the stream to satisfy LNG specifications. The process utilizes adsorbent bed units (e.g., each having parallel channel adsorbent beds), wherein the adsorbent bed units are partially depressurized and heated using a heating loop at a heating temperature and a purge stream at a purge temperature for thermally assisted partial pressure desorption. Then, the feed stream is used to cool the adsorbent bed during the adsorption step of the cycle. In particular, a rapid cycle swing adsorption process is used to treat natural gas that is at pipeline specifications (e.g., a feed stream of predominately hydrocarbons along with less than or equal to about 2 molar % $CO_2$ and/or less than or equal to 4 ppm $H_2S$) to form a stream satisfying the LNG specifications (e.g., less than 100 ppm or even 50 ppm $CO_2$ and less than about 4 ppm $H_2S$). By way of example, the gaseous feed stream may include hydrocarbons and $CO_2$, wherein the $CO_2$ content is in the range of one hundred parts per million volume and less than or equal to about 5 molar % of the gaseous feed stream or in the range of two hundred parts per million volume and less than or equal to about 2 molar % of the gaseous feed stream. The heating step may also provide some additional purge by removing one or more contaminants from the adsorbent bed.

As compared to the conventional amine-solvent based separation system, the present techniques provide various enhancements. The present techniques may involve performing rapid cycles swing adsorption (e.g., performing the cycle in minutes instead of hours) and/or may involve the use of open parallel channel adsorbent bed structures, which provide a mechanism for higher gas flows at reduced pressure drops (e.g., providing more rapid flows during the heating and adsorption steps) to provide the flexibility to handle the higher levels of $CO_2$. Further, the adsorbent bed units may be more compact because of the use of a rapid cycle swing adsorption process. As a result, the configuration may lessen the footprint and lower capital investment as compared to a conventional amine-solvent based separation system. Accordingly, higher $CO_2$ concentrations may be reduced to the LNG target specifications in a more economical manner, and with smaller footprint and less weight than conventional molecular sieve units may provide.

Further, as compared to the conventional TSA adsorption system, the present techniques provide various enhancements. For example, one of the enhancements of the present techniques is that it may extend the economically viable operating envelope of an adsorbent based temperature and/or pressure swing adsorption process for such gas treatment. In particular, the present techniques may extend to higher levels of the $CO_2$ concentrations than may be handled by a conventional TSA adsorption systems. Indeed, the present techniques provide a system that addresses the large size and poor economics of conventional systems.

In one or more embodiments, the present techniques provide a unique combination of rapid cycle temperature and pressure swing adsorption to provide the necessary separation. For example, in an adsorption or feed step, pipeline quality feed gas may be introduced as a feed stream into an adsorbent bed containing an adsorbent material chosen to preferentially adsorb $CO_2$. Then, the gas stream exiting the adsorbent bed, which is the product stream, is at LNG specification (e.g., containing less than 100 ppm of $CO_2$ or less than 50 ppm of $CO_2$). As the adsorbent bed nears saturation, the feed stream is interrupted and diverted to a different adsorbent bed, and the current adsorbent bed is regenerated in a regeneration step. The regeneration step may include one or more depressurization steps, such as one or more purge steps and/or one or more blowdown steps, where the pressure within the housing of the adsorbent bed is reduced for each subsequent step. The regenerations step results in desorption of some of the methane gas that co-adsorbed with $CO_2$ during the adsorption step. The blowdown output stream is typically of high purity and can be compressed to mix with the product stream which is at LNG specifications. Alternatively, if there is a higher amount of $CO_2$ in this stream, then it can be compressed to mix with the feed stream.

Next the adsorbent bed is subjected to a heating step at the lower pressure. This heating step represents a combination of partial pressure swing adsorption and temperature swing adsorption to facilitate regeneration of the adsorbent bed. The heating step may be provided in several manners, such as electrical heating of the metal substrate in the adsorbent bed, passing a heating stream through the adsorbent bed and/or convective heating from a hermetically sealed heating fluid. When the heating step is performed at low pressure, the concentration of $CO_2$ in this stream should be lessened, as it distributes over the adsorbent bed. In the certain embodiments, the heating step may involve mixing the outlet purge stream (e.g., the product of the purge stream) with the heating loop stream and then conducting away the combined stream for fuel. Alternatively, the heating loop may be performed at high pressure and temperature with a stream of predominantly $CO_2$. In such configuration, the blowdown step may be performed at atmospheric pressure with the blowdown stream conducted away for fuel (not product), and then the adsorbent bed may be purged. However, the preferred cycle may involve limiting the amount of $CO_2$ in the heating stream (e.g., to less than about 20 molar %).

In certain aspects, as described further below, the present techniques may involve using a high temperature heating loop to heat the adsorbent bed for the combined swing adsorption process, which are performed at a heating temperature and a heating pressure. The heating temperature may be less than 500° F. (260° C.), less than 450° F. (232.2° C.) or may be less than 400° F. (204.4° C.), and may be greater than 100° F. (55.6° C.) of the feed temperature, greater than 150° F. (83.3° C.) of the feed temperature or greater than 200° F. (111.1° C.) of the feed temperature. The heating pressure may be in the range between 0.01 bara and 100 bara, between 1 bara and 80 bara, or between 2 bara and 50 bara. The heating loop may include conduits and manifolds that provide a fluid path for the heating stream through a storage tank, a heating unit (furnace and/or heat exchanger), and blower or compressor to fluidly communication with one or more adsorbent beds. The heating stream may contain predominantly methane (e.g., heating stream) along with $CO_2$ or other contaminants. As the adsorbent bed is heated, at least a portion of the $CO_2$ adsorbed in the adsorbent bed is released, which mixes with the heating stream and is conducted away from the adsorbent bed into the flow of the heating loop. This step removes a significant amount of $CO_2$ that is adsorbed in the adsorbent bed, in some applications may be up to 85 molar % of the total adsorbed $CO_2$. Further, the heating pressure being lower also enhances the removal of the $CO_2$ from the adsorbent bed.

The heating step may not heat the entire length of the adsorbent bed to minimize any contaminant breakthrough. Because the adsorbent bed is cooled by certain streams and reactions, the temperature differential may provide for an adsorption wave to form at the feed end (e.g., front of the cooled adsorbent bed) and then moves in the feed direction along the adsorbent bed. As the adsorption front is forming in the front of the adsorbent bed (e.g., near the feed end), the remainder of the adsorbent bed is cooled by the feed prior to the adsorption front advancing to that point. This provides a mechanism for the process to produce LNG quality gas in the initial second or so of feed. For example, the heating step may be configured to result in a temperature differential between the feed end and the product end of the adsorbent bed. The temperature differential is the difference in temperatures between a feed end of the adsorbent bed and a product end of the adsorbent bed, which may be calculated by subtracting the temperature at the product end of the adsorbent bed from the temperature at the feed end of the adsorbent bed. The temperatures may be the measured temperatures by a thermocouple or other temperature measurement device. The feed end or feed side is the end of the adsorbent bed that the feed stream initially enters, while the product end is the portion of the adsorbent bed opposite from the feed end and where the feed stream exits the adsorbent bed. The temperature differential may range between 50° F. (27.8° C.) and 400° F. (222.2° C.), range between 100° F. (55.6° C.) and 400° F. (222.2° C.), range between 125° F. (69.4° C.) and 350° F. (194.4° C.) or range between 175° F. (97.2° C.) and 300° F. (166.7° C.). The temperature differential may be utilized to have the feed stream enter the adsorbent bed from the feed end and remove contaminants (e.g., $CO_2$ and/or water) prior to being exposed to the higher temperature portion of the adsorbent bed. The lower temperature portion of the adsorbent bed may be referred to as the heating feed region, the portion of the adsorbent bed that is at the heating temperature may be referred to as the heating product region and the portion of the adsorbent bed that transitions from the heating feed region to the heating product region (e.g., portion with the heating front that increases the temperature differential of these regions) may be referred to as the heating front region. These different regions may vary as the heating step is being performed with the end of the heating step being the maximum heating product region and minimal heating feed region. The heating feed region may be a specific portion of the adsorbent bed from the feed end of the adsorbent bed to 2% of the bed length, from the feed end of the adsorbent bed to 5% of the bed length, from the feed end of the adsorbent bed to 10% of the bed length or from the feed end of the adsorbent bed to 20% of the bed length. The heating product region may be a specific portion of the adsorbent bed from the product end of the adsorbent bed to 60% of the bed length, from the product end of the adsorbent bed to 55% of the bed length or from the product end of the adsorbent bed to 50% of the bed length. Further, the heating step may include heating a portion of the adsorbent bed from a product end of the adsorbent bed to be within a certain range around the heating temperature (e.g., 10% of the heating temperature and/or within 5% of the heating temperature). The movement of the cooling front is toward to the product end during the adsorption step and toward the feed end during the heating step.

Next, the adsorbent bed is purged with a purge stream provided at a purge temperature and purge pressure. The purge stream may be a high purity methane stream, which may be provided from downstream processing equipment. For example, the purge stream may be the flash fuel gas sourced from the LNG liquefaction process, which is usually a purified stream (e.g., predominantly methane, but may include nitrogen less than 40%). This purge stream may be used to remove at least a portion of the remaining $CO_2$ that is adsorbed in the adsorbent bed, thus completing the regeneration of the adsorbent bed. The purge output stream exiting the adsorbent bed may be mixed with the heating stream in the heating loop. From this heating loop, a fuel stream may be drawn out of this heating loop to maintain mass balances and remove a portion of the $CO_2$ from the heating stream and the process.

Further, the present techniques may not remove all of the $CO_2$ adsorbed in the bed during the regeneration step, but remove a portion of the $CO_2$ such that the product end of the adsorbent bed has a $CO_2$ loading sufficiently low to provide a product stream with less than 50 ppm $CO_2$. Accordingly, the product end of the adsorbent bed may be maintained nearly free of $CO_2$ (e.g., the $CO_2$ loading for the region near the product end is less than 1 millimole per gram (mmol/g), less than 0.5 mmol/g or less than 0.1 mmol/g). The loading level of $CO_2$ may be lower on the feed side of the adsorbent bed during the purge step, but the length of adsorbent bed that contains $CO_2$ is reduced during the purge step. For example, a feed region may be a specific portion of the adsorbent bed from the feed end of the adsorbent bed to 10% of the bed length, from the feed end of the adsorbent bed to 25% of the bed length or from the feed end of the adsorbent bed to 40% of the bed length. The product region may be a specific portion of the adsorbent bed from the product end of the adsorbent bed to 10% of the bed length, from the product end of the adsorbent bed to 25% of the bed length or from the product end of the adsorbent bed to 40% of the bed length. The movement of the $CO_2$ front back during purge step and forward during the adsorption step is the basis of the swing capacity of the process. In part, this is achieved by using a limited, cost effective quantity of purge gas in the purge steam along with the heating of the adsorbent bed in this process and configuration.

Subsequently, the adsorbent bed is repressurized back to the feed pressure and the cycle is repeated. The repressurization of the adsorbent bed may be used without a cooling loop. The purge step and heating step may heat the adsorbent bed and the adsorption step may be used to cool the adsorbent bed, which enhances the efficiency of the system by removing the need for a separate cooling loop.

The present techniques may involve using two or more adsorbent beds, which are operated on similar cycle that are performing different steps of the cycles (e.g., not synchronized with each other) to maintain a steady flow of fluids for the various streams (e.g., feed stream, product stream, heating stream, and purge stream).

Further, in other embodiments, the pressure of the different streams may be varied. For example, the feed stream may involve a feed pressure that ranges range between 40 bar absolute (bara) and 150 bara, between 50 bara and 150 bara, or preferably between 50 bara and 100 bara, but is not necessarily limited to this range. The feed temperature may be in the range between −40° F. (−40° C.) and 200° F. (93.3° C.), in the range between 0° F. (−17.8° C.) and 200° F. (93.3° C.), in the range between 20° F. (−6.7° C.) and 175° F. (79.4° C.) or in the range between 40° F. (4.4° C.) and 150° F. (65.6° C.). The blowdown pressure, heating pressure, and purge pressure may be adjusted depending on the cycle, may depend upon the adsorbent material being utilized and/or may range from vacuum to feed pressure. For example, if the adsorbent material is zeolite 4A, the blowdown pressure range may be between 0.01 bara to 45 bara, or more preferably in a range between 1 bara and 25 bara. This example may depend on the feed concentration of $CO_2$. Also, in other embodiments, the depressurization steps may be adjusted such that the pressure swing is achieved in stages to vary the amount of methane desorbing during each step, if any. Additionally, the heating pressure in the heating loop may be operated at a pressure different from the purge pressure or blowdown pressure in the respective steps. Also, certain embodiments may include no pressure swing, but may rely upon temperature swing for the regeneration step. Similarly, in the other embodiments, no temperature swing may be performed and the regeneration step may be performed by pressure swing.

In yet other embodiments, the present techniques may be integrated with other processes, such as control freeze zone (CFZ) applications, cryogenic Natural Gas Liquid (NGL) recovery applications, and other such applications. Each of these different applications may include different specifications for the feed stream in the respective process. For example, variants of the present techniques may be used to treat gases containing higher or lower amounts of $CO_2$ as compared to LNG specifications or pipeline specifications.

Furthermore, in certain embodiments, the above process may be used to separate any two or more contaminants from the feed stream (e.g., to treat the feed stream, which may be pipeline quality gas, to LNG specifications). For example, if the feed stream includes additional equipment (e.g., dehydration adsorption unit, such as molecular sieve adsorption unit and/or dehydration adsorbent bed unit) to remove water from the stream and may be integrated with the present techniques to further process the stream. For example, a dehydration process may be performed upstream of the $CO_2$ removal in the adsorbent bed units by dehydration equipment, such as a molecular sieve or a swing adsorption process (e.g., RCPSA and/or RCTSA). In particular, a molecular sieve unit or a first adsorbent bed unit may be used to remove water, while a second adsorbent bed unit may be used to remove $CO_2$. Alternatively, in another configuration, an integrated rapid cycle adsorption system may be utilized to remove multiple contaminants (e.g., water and $CO_2$). Suitable adsorbent material or adsorbent layers may be utilized to provide the dehydration, which may be the same or different from the adsorbent material used to in the removal of other contaminants, such as $CO_2$.

Moreover, the present techniques may include a specific process flow to remove contaminants, such as $CO_2$ and/or water. For example, the process may include an adsorbent step and a regeneration step, which form the cycle. The adsorbent step may include passing a gaseous feed stream at a feed pressure and feed temperature through an adsorbent bed unit to separate one or more contaminants from the gaseous feed stream to form a product stream. The feed stream may be passed through the adsorbent bed in a forward direction (e.g., from the feed end of the adsorbent bed to the product end of the adsorbent bed). Then, the flow of the gaseous feed stream may be interrupted for a regeneration step. The regeneration step may include one or more depressurization steps, one or more heating steps and one or more purge steps. The depressurization steps, which may be or include a blowdown step, may include reducing the pressure of the adsorbent bed unit by a predetermined amount for each successive depressurization step, which may be a single step and/or multiple steps. The depressurization step may be provided in a forward direction or may preferably be provided in a countercurrent direction (e.g., from the product end of the adsorbent bed to the feed end of the adsorbent bed). The heating step may include passing a heating stream into the adsorbent bed unit, which may be a recycled stream through the heating loop and is used to heat the adsorbent material. For example, the ratio of heating stream (e.g., loop gas) to feed stream (e.g., feed gas) may be based on the type of adsorbent material, the feed concentration of $CO_2$ in the feed stream, and the frequency of the heating of the adsorbent bed. The temperature of the heating loop leaving the adsorbent bed is lower than the heating loop inlet temperature by at least 50° F. (27.8° C.). For low feed concentrations of $CO_2$ in the feed stream, the longer duration of adsorbent step may involve less reheating of the adsorbent bed. For example, if the stream has 2 molar % $CO_2$ in the feed stream, then about 50 volume % to 60 volume % of the feed stream may be used in heating stream, while for 0.5 molar % $CO_2$ in the feed stream, then about 15 volume % to 25 volume % of the feed stream may be used in the heating stream.

The heating stream, which may be provided at a heating temperature and heating pressure, may be provided in countercurrent flow relative to the feed stream. The purge step may include passing a purge stream into the adsorbent bed unit, which may be a once through purge step and the purge stream may be provided in countercurrent flow relative to the feed stream. The purge stream may be provided at a purge temperature and purge pressure, which may include the purge temperature and purge pressure being similar to the heating temperature and heating pressure used in the heating step. Then, the cycle may be repeated for additional streams. Additionally, the process may include one or more re-pressurization steps after the purge step and prior to the adsorption step. The one or more re-pressurization steps may be performed, wherein the pressure within the adsorbent bed unit is increased with each re-pressurization step by a predetermined amount with each successive re-pressurization step. The cycle duration may be for a period greater than 1 second and less than 600 seconds, for a period greater than 2 seconds and less than 300 seconds, for a period greater than 2 second and less than 180 seconds or for a period greater than 5 second and less than 90 seconds.

In certain embodiment, the present techniques the gasous feed stream may be cooled upstream of the swing adsorption process or upstream of one of the adsorbent bed units. The cooling of the gasous feed stream may be performed upstream of the adsrobent bed unit to increase the capacity of the adsorbent material. For example, a propane chiller may be used to chill the feed gas stream to −20° C. This may result in an increase in the capacity of the adsorbent.

In one or more embodiments, the swing adsorption system may include one or more purge units in fluid communication with a liquefied natural gas process unit. The purge units may be configured to provide a purge stream to each of the adsorbent bed units, wherein the purge stream is provided from one of a portion of the product stream, the flash fuel stream, a boil off gas stream and any combination thereof. By way of example, the purge units may be or include one or more compressors configured to compress one of the flash fuel stream, a boil off gas stream and any combination thereof. Also, the purge units may be or include one or more pressure reduction devices (e.g., expanders or valve) configured to decompress the portion of the product stream. The portion of the product stream may be from any one of the adsorbent bed units within the swing adsorption system.

In one or more embodiments, the present techniques can be used for any type of swing adsorption process. Non-limiting swing adsorption processes for which the present techniques may be used include pressure swing adsorption (PSA), vacuum pressure swing adsorption (VPSA), temperature swing adsorption (TSA), partial pressure swing adsorption (PPSA), rapid cycle pressure swing adsorption (RCPSA), rapid cycle thermal swing adsorption (RCTSA), rapid cycle partial pressure swing adsorption (RCPPSA), as well as combinations of these processes. For example, the preferred swing adsorption process may include a combined pressure swing adsorption and temperature swing adsorption, which may be performed as a rapid cycle process. Exemplary swing adsorption processes are further described in U.S. Patent Application Publication Nos. 2008/0282892, 2008/0282887, 2008/0282886, 2008/0282885, 2008/0282884 and 20140013955, which are each herein incorporated by reference in their entirety.

By way of example, the swing adsorption process may include specific steps in performing a cycle. The swing adsorption process may include a heating mechanism, which may be configured to pass a heating stream at a heating temperature into the adsorbent bed unit, wherein the heating stream is configured to create a temperature differential in a range between 50° F. (27.8° C.) and 400° F. (222.2° C.), wherein the temperature differential is the difference in temperatures between a feed end of the adsorbent bed and a product end of the adsorbent bed; and may combine a portion of the heating stream with the purge stream that is passed through the adsorbent bed unit. The heating mechanism may include a heating loop that includes a heating unit configured to heat the heating stream prior to passing the heating stream to the adsorbent bed unit. Further, the heating loop may include a blower in fluid communication with the heating unit and configured to increase the pressure of the heating stream prior to passing the heating stream to the adsorbent bed unit. Also, the heating mechanism may comprise one or more conduits and valves that are configured to pass a purge product stream from a second adsorbent bed unit through the adsorbent bed unit.

As a first example, the swing adsorption process may include (i) an adsorption step to pass the gaseous feed stream through the adsorbent bed unit and produce a product stream, (ii) a blow down step to lower the pressure within the adsorbent bed unit and purge contaminants, (iii) a heating step to heat the adsorbent bed, which may involve a heating mechanism (e.g., heating loop, multiple purge steps or other suitable method to heat the adsorbent bed; (iv) a purge step that involves passing a purge stream through the adsorbent bed unit to remove contaminants from the adsorbent bed unit; (v) an optional repressurization step to increase the pressure within the adsorbent bed unit and then the process may repeat to steps (i) to (v) for an additional cycle. As a second example, the swing adsorption process may include one or more purge steps that are used as the heating step. In particular, the method may include (i) an adsorption step to pass the gaseous feed stream through the adsorbent bed unit and produce a product stream, (ii) a blow down step to lower the pressure within the adsorbent bed unit and purge contaminants; (iii) a first purge step to pass a first purge stream through the adsorbent bed unit at a first purge pressure and a first purge pressure (e.g., less than 500° F. (260° C.) or in the range between 50° F. (27.8° C.) above the feed stream and 450° F. (232.2° C.)) to remove contaminants (e.g., a stream from another adsorbent bed purge stream, which may be heated prior to being), (iv) a second purge step to pass a second purge stream through the adsorbent bed unit at a second purge pressure and a second purge temperature (which may be within the temperature range of the first purge temperature) to remove contaminants (e.g., a stream from another adsorbent bed purge stream); (v) a third purge step to pass a third purge stream through the adsorbent bed unit at a third purge pressure to remove contaminants (e.g., a stream that has not passed through an adsorbent bed); (vi) an optional repressurization step to increase the pressure within the adsorbent bed unit and then the process may repeat to steps (i) to (vi) for an additional cycle. As a third example, the swing adsorption process may include (i) an adsorption step to pass the gaseous feed stream through the adsorbent bed unit and produce a product stream, (ii) a blow down step to lower the pressure within the adsorbent bed unit and purge contaminants; (iii) a first purge step to pass a first purge stream through the adsorbent bed unit at a first purge pressure to remove contaminants, (iv) a second purge step to pass a second purge stream through the adsorbent bed unit at a second purge pressure to remove contaminants, wherein the second purge pressure is lower than the first purge pressure; (v) an optional repressurization step to increase the pressure within the adsorbent bed unit and then the process may repeat to steps (i) to (v) for an additional cycle.

Further still, in one or more embodiments, a variety of adsorbent materials may be used to provide the mechanism for the separations. Examples include zeolite 3A, 4A, 5A, ZK4 and MOF-74. However, the process is not limited to these adsorbent materials, and others may be used as well.

Beneficially, the present techniques provide various enhancements over conventional techniques. For example, the present techniques provide a modular design, which may be configured to lessen the footprint, weight, and capital expense of the system used to treat pipeline gas being used to form an LNG stream that complies with LNG specification. Also, as this process does not use any aqueous medium (e.g., an amine wash), subsequent dehydration steps are minimized or eliminated. Further, the present techniques may lessen or eliminate the use of solvents, which remove solvents from the process. Moreover, the present techniques may include reduced emissions (e.g. eliminates amine regenerator vent) as compared to conventional processes. The present techniques may be further understood with reference to the FIGS. 1 to 8 below.

FIG. 1 is a three-dimensional diagram of the swing adsorption system 100 having six adsorbent bed units and interconnecting piping. While this configuration is a specific example, the present techniques broadly relate to adsorbent bed units that can be deployed in a symmetrical orientation, or non-symmetrical orientation and/or combination of a plurality of hardware skids. Further, this specific configuration is for exemplary purposes as other configurations may include different numbers of adsorbent bed units.

In this system, the adsorbent bed units, such as adsorbent bed unit 102, may be configured for a cyclical swing adsorption process for removing contaminants from feed streams (e.g., fluids, gaseous or liquids). For example, the adsorbent bed unit 102 may include various conduits (e.g., conduit 104) for managing the flow of fluids through, to or from the adsorbent bed within the adsorbent bed unit 102. These conduits from the adsorbent bed units 102 may be coupled to a manifold (e.g., manifold 106) to distribute the flow to, from or between components. The adsorbent bed within an adsorbent bed unit may separate one or more contaminants from the feed stream to form a product stream. As may be appreciated, the adsorbent bed units may include other conduits to control other fluid steams as part of the process, such as purge streams, depressurizations streams, and the like. In particular, the adsorbent bed units may include a heating loop (not shown), as noted further below, which is used to remove the contaminants from the adsorbent bed. Further, the adsorbent bed unit may also include one or more equalization vessels, such as equalization vessel 108, which are dedicated to the adsorbent bed unit and may be dedicated to one or more step in the swing adsorption process.

As an example, which is discussed further below in FIG. 2, the adsorbent bed unit 102 may include a housing, which may include a head portion and other body portions, that forms a substantially gas impermeable partition, an adsorbent bed disposed within the housing and a plurality of valves (e.g., poppet valves) providing fluid flow passages through openings in the housing between the interior region of the housing and locations external to the interior region of the housing. Each of the poppet valves may include a disk element that is seatable within the head or a disk element that is seatable within a separate valve seat inserted within the head (not shown). The configuration of the poppet valves may be any variety of valve patterns or configuration of types of poppet valves. As an example, the adsorbent bed unit may include one or more poppet valves, each in flow communication with a different conduit associated with different streams. The poppet valves may provide fluid communication between the adsorbent bed and one of the respective conduits, manifolds or headers. The term "in direct flow communication" or "in direct fluid communication" means in direct flow communication without intervening valves or other closure means for obstructing flow. As may be appreciated, other variations may also be envisioned within the scope of the present techniques.

The adsorbent bed comprises a solid adsorbent material capable of adsorbing one or more components from the feed stream. Such solid adsorbent materials are selected to be durable against the physical and chemical conditions within the adsorbent bed unit 102 and can include metallic, ceramic, or other materials, depending on the adsorption process. Further examples of adsorbent materials are noted further below.

Figure 2:
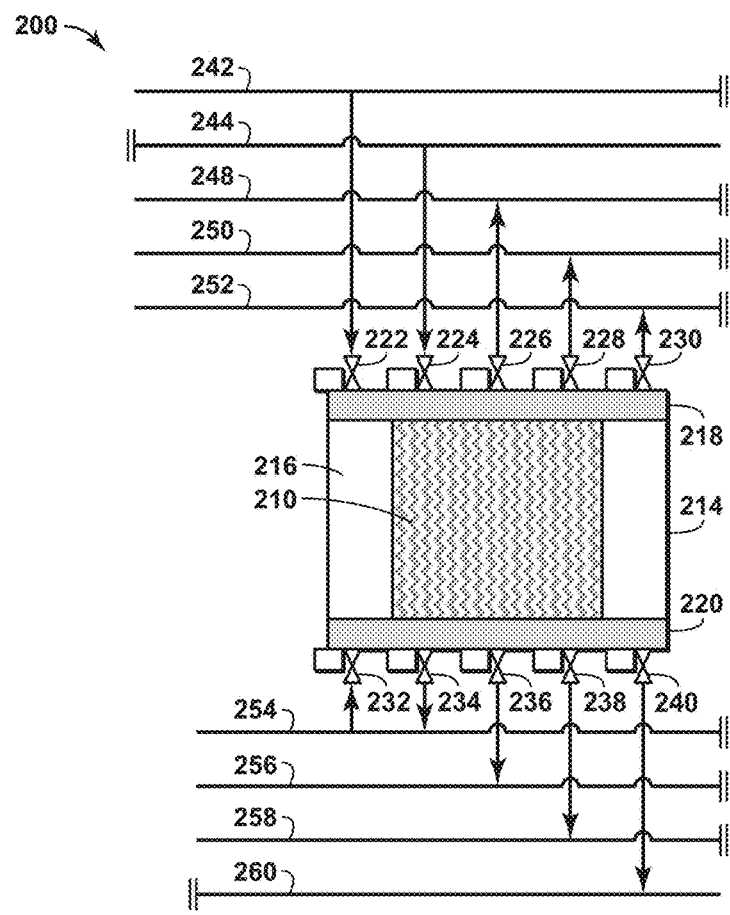
FIG. 2 is a diagram of a portion of an adsorbent bed unit having associated valve assemblies and manifolds in accordance with an embodiment of the present techniques.

FIG. 2 is a diagram of a portion of an adsorbent bed unit 200 having valve assemblies and manifolds in accordance with an embodiment of the present techniques. The portion of the adsorbent bed unit 200, which may be a portion of the adsorbent bed unit 102 of FIG. 1, includes a housing or body, which may include a cylindrical wall 214 and cylindrical insulation layer 216 along with an upper head 218 and a lower head 220. An adsorbent bed 210 is disposed between an upper head 218 and a lower head 220 and the insulation layer 216, resulting in an upper open zone, and lower open zone, which open zones are comprised substantially of open flow path volume. Such open flow path volume in adsorbent bed unit contains gas that has to be managed for the various steps. The housing may be configured to maintain a pressure from 0 bara (bar absolute) to 150 bara within the interior region.

The upper head 218 and lower head 220 contain openings in which valve structures can be inserted, such as valve assemblies 222 to 240, respectively (e.g., poppet valves). The upper or lower open flow path volume between the respective head 218 or 220 and adsorbent bed 210 can also contain distribution lines (not shown) which directly introduce fluids into the adsorbent bed 210. The upper head 218 contains various openings (not show) to provide flow passages through the inlet manifolds 242 and 244 and the outlet manifolds 248, 250 and 252, while the lower head 220 contains various openings (not shown) to provide flow passages through the inlet manifold 254 and the outlet manifolds 256, 258 and 260. Disposed in fluid communication with the respective manifolds 242 to 260 are the valve assemblies 222 to 240. If the valve assemblies 222 to 240 are poppet valves, each may include a disk element connected to a stem element which can be positioned within a bushing or valve guide. The stem element may be connected to an actuating means, such as actuating means (not shown), which is configured to have the respective valve impart linear motion to the respective stem. As may be appreciated, the actuating means may be operated independently for different steps in the process to activate a single valve or a single actuating means may be utilized to control two or more valves. Further, while the openings may be substantially similar in size, the openings and inlet valves for inlet manifolds may have a smaller diameter than those for outlet manifolds, given that the gas volumes passing through the inlets may tend to be lower than product volumes passing through the outlets.

In swing adsorption processes, the cycle involves two or more steps that each has a certain time interval, which are summed together to be the cycle time or cycle duration. These steps include regeneration of the adsorbent bed following the adsorption step using a variety of methods including pressure swing, vacuum swing, temperature swing, purging (via any suitable type of purge fluid for the process), and combinations thereof. As an example, a PSA cycle may include the steps of adsorption, depressurization, purging, and re-pressurization. When performing the separation at high pressure, depressurization and re-pressurization (which may be referred to as equalization) may be performed in multiple steps to reduce the pressure change for each step and enhance efficiency. In some swing adsorption processes, such as rapid cycle swing adsorption processes, a substantial portion of the total cycle time is involved in the regeneration of the adsorbent bed. Accordingly, any reductions in the amount of time for regeneration results in a reduction of the total cycle time. This reduction may also reduce the overall size of the swing adsorption system.

Figure 3:
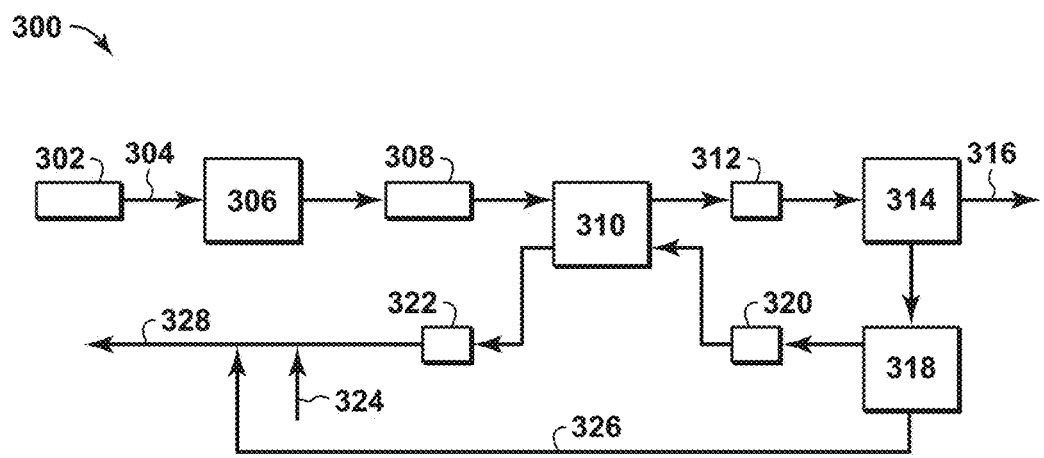
FIG. 3 is a diagram of a conventional system for treating of a feed stream to form a liquefied natural gas (LNG) stream.

As noted above, conventional systems include amine to remove contaminants from the gas treating process in a liquefaction train. As an example, FIG. 3 is a diagram of a conventional system 300 for treating of a feed stream to form a liquefied natural gas (LNG) stream. As shown in the diagram, the system 300 includes various equipment, such as units 302, 306, 308, 310, 312, 314, 318, 320 and 322, that are utilized to process a stream into a feed stream in conduit 304 and then into a LNG stream in conduit 316.

The process begins at a mercury removal unit 302, which receives a stream and separates mercury from the input stream. The output stream from the mercury removal unit 302 is a feed stream provided via conduit 304 to an amine unit 306. The amine unit 306 is utilized to separate contaminants from the feed stream. The contaminants may include $CO_2$ and sulfur containing species. The output from the amine unit 306 is provided to a filter 308. The filter 308 is configured to remove both particular and liquid droplet carryover from the amine unit 306. Then, the output from the filter 308 is provided to the molecular sieve unit 310. The molecular sieve unit 310 is configured to separate additional contaminants, such as water from the stream. The dehydrated output from the molecular sieve unit 310 is conveyed to the LNG process unit 314. The liquefied natural gas output from the LNG process unit 314 is a final product that may be used for sales, shipment or storage. An additional stream from the LNG process unit 314 may be referred to as the flash fuel stream, flash gas or flash/fuel gas or end flash gas and is a lower pressure high purity methane side stream. The flash fuel stream is conveyed to a fuel gas compressor unit 318. A portion of the output of the fuel gas compressor unit 318 is heated in a heating unit 320, which is either a furnace or heat exchanger, and the resulting stream, which is a purge stream, is used to thermally swing the temperature for desorption of the molecular sieve unit 310. The purge output stream is conducted away from the molecular sieve unit 310, is cooled in a heat exchanger unit 322. The cooled purge output stream is combined with the remaining portion of the output of the fuel gas compressor unit 318 from conduit 326. The resulting stream is conducted away as via conduit 328 for use as a fuel. Additionally, a boil off gas stream may optionally be added to the purge output stream upstream of the conduit 326.

Figure 4:
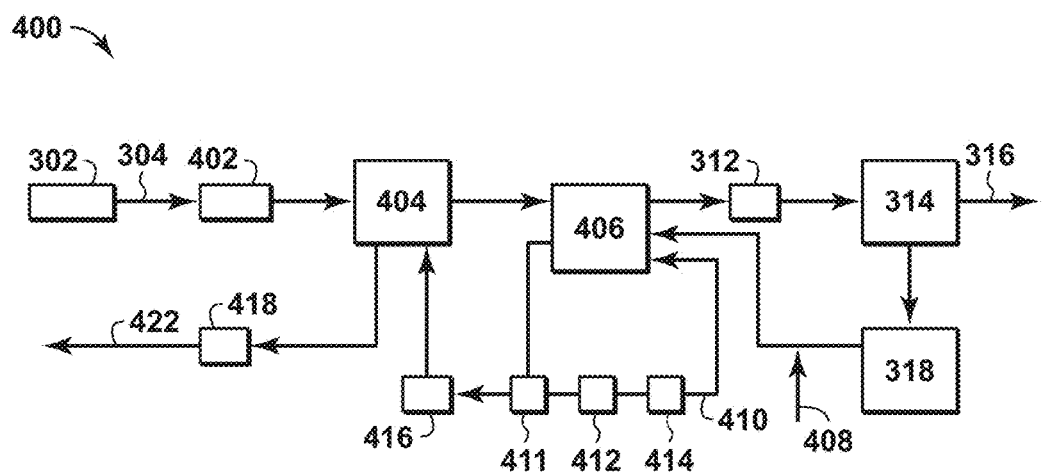
FIG. 4 is an exemplary diagram of a system for treating of a feed stream to form a LNG stream in accordance with an embodiment of the present techniques.
Figure 7:
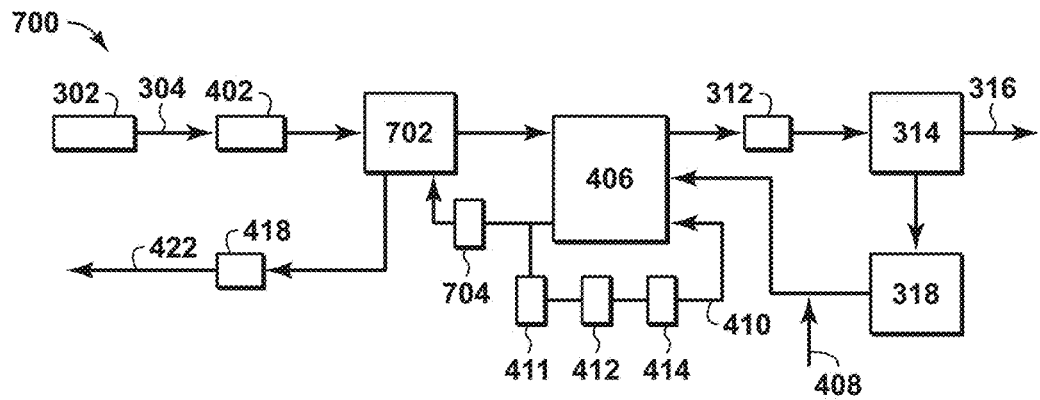
FIG. 7 is another exemplary diagram of a system for treating of a feed stream to form a LNG stream in accordance with an embodiment of the present techniques.
Figure 8:
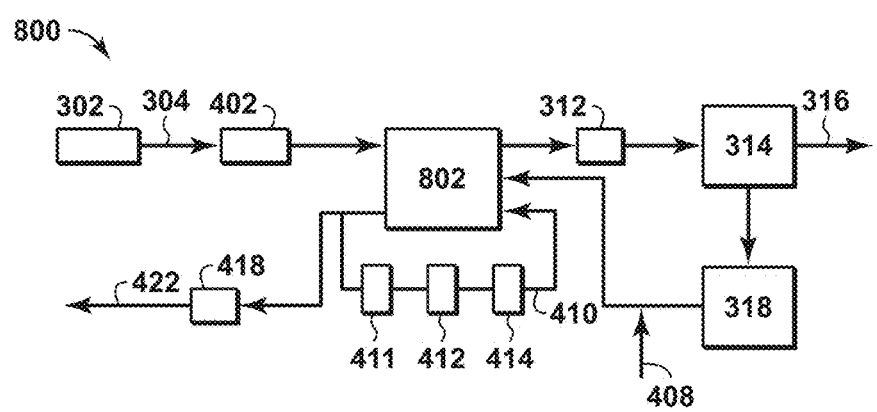
FIG. 8 is yet another exemplary diagram of a system for treating of a feed stream to form a LNG stream in accordance with an embodiment of the present techniques.

As described above, natural gas feed streams for liquefied natural gas (LNG) applications have stringent specifications on the $CO_2$ content to ensure against formation of solid $CO_2$ at cryogenic temperatures. As such, for LNG facilities that use the pipeline gas as the raw feed, additional treating steps may be utilized, such as the present techniques. For example, the present techniques may include a configuration that receives a pipeline quality feed gas, treats the stream in a molecular sieve unit to dehydrate the stream before introduction into the adsorbent bed unit. The adsorbent bed unit may perform a rapid cycle swing adsorption process to remove $CO_2$ from the stream to satisfy LNG specifications, as shown in FIG. 4. Also, in an alternative embodiment, the pipeline gas stream is dehydrated using a rapid cycle swing adsorption process, as shown in FIG. 7, while the another alternative embodiment may involve an integrated rapid cycle swing adsorption process to dehydrate and remove $CO_2$ from the pipeline gas stream to satisfy LNG specifications, as shown in FIG. 8.

FIG. 4 is an exemplary diagram of a system 400 for treating of a feed stream to form a liquefied natural gas (LNG) stream in accordance with an embodiment of the present techniques. The system includes a molecular sieve unit 404 configured to remove water upstream of an adsorbent bed unit 406 configured to remove $CO_2$. The adsorbent bed unit 406 may be used to perform a rapid cycle swing adsorption process, which may involve passing various streams through the adsorbent bed unit 406. As part of this process, a heating step via a heating loop may be used along with a purge step to remove contaminants from the adsorbent bed within the adsorbent bed unit 406. As may be appreciated, the molecular sieve dehydration unit 404 and adsorbent bed unit 406 may include multiple units to perform the respective processes. Further, the molecular sieve dehydration unit 404 and adsorbent bed unit 406 may each operate with different cycles, which involve adsorption steps and regenerations steps in the respective cycles. Also, as certain equipment or units are similar to those in FIG. 3, these units are referenced by the same reference character in this system 400.

In this system, the process begins at a mercury removal unit 302, which receives an input stream and separates mercury from the input stream. The output stream from the mercury removal unit 302 is provided via conduit 304 to a filter unit 402, which is configured to remove any particular matter from the stream. The output stream from the filter unit 402 is the feed stream to the molecular sieve dehydration unit 404, during its adsorption step. The molecular sieve dehydration unit 404 includes a housing having an adsorbent material disposed within the housing. During the adsorption step, the molecular sieve dehydration unit 404 is configured to lower the water content of the stream to less than 0.1 ppmv by adsorbing the water from the stream into the adsorbent material and passing the remaining portion of the stream out of the adsorbent material and the unit. The dehydrated stream from the molecular sieve dehydration unit 404 is provided to the adsorbent bed unit 406 during its adsorption step. The adsorbent bed unit 406, which may include one or more of the adsorbent bed units discussed above in FIGS. 1 and 2, may include a housing with an adsorbent material disposed within the housing. The adsorbent bed unit 406 may be configured to remove at least a portion of the $CO_2$ from the dehydrated stream (e.g., $CO_2$ content to be less than 100 ppm or less than 50 ppm) to form the LNG feed stream.

Following the removal of contaminants in units 402, 404 and 406, the LNG feed stream is provided for LNG processing in a manner similar to the discussion of FIG. 3 above. The LNG feed stream is passed through the heat exchanger 312 and the cooled LNG feed stream is provided to the LNG process unit 314. From this LNG process unit 314, a liquefied natural gas stream is provided via conduit 316 and a flash fuel stream is provided to the fuel gas compressor unit 318.

In this configuration, the system includes a heating step that is combined with a purge step as part of the regeneration step in the cycle for the adsorbent bed unit 406. The purge stream is formed from the output from the fuel gas compressor unit 318, which may be combined with a boil off gas stream from conduit 408. This purge stream is passed to the adsorbent bed unit 406 during the purge step as the purge gas. Alternatively, in other configurations, a portion of the product stream may be used as the purge stream or combined with other streams to be used as the purge stream. A heating stream is formed as a portion of the output stream from the adsorbent bed unit 406, which is separated into a heating loop 410 (e.g., flow path through heating equipment), which passes through a storage unit 411, a heating unit 412 and a blower 414. The storage unit 411 is a vessel that is configured to store the heating stream and to be the source of a portion of the heating stream, and to provide a portion of the heating stream as a fuel gas via a conduit or other equipment (not shown). The heating unit 412 may be a furnace and/or heat exchanger that is configured to increase the temperature of the heating stream and acts as a mechanism to heat the fluids in the heating stream for the regeneration of the adsorbent bed unit 406, while the blower 414 may be a compressor or other equipment that is configured to increase the pressure of the heating stream and/or to convey the heating stream along the flow path of the heating loop 410.

The remaining portion of the stream from the adsorbent bed unit 406 and the heated portion that is passed through and outputted from the adsorbent bed unit 406 are combined and passed through a conditioning unit 416 to the molecular sieve dehydration unit 404 for its regeneration step. The conditioning unit 416 may be used to heat the combined stream for regeneration of the molecular sieve dehydration unit 404 and may also be utilized to increase the pressure of the combined stream. In particular, the conditioning unit may be a heat exchange or furnace coupled with a compressor (e.g., a standalone compressor or one or more stages in the fuel gas compressor unit 318). After the output of heat exchanger unit 418 is used to heat and regenerate the molecular sieve dehydration unit 404, the regeneration stream exits molecular sieve dehydration unit 404 and is passed to the heat exchanger unit 418. The heat exchanger unit 418 is configured to condition the stream in heat exchanger unit 418. Then, the stream from the heat exchanger unit 418 is provided as the process fuel gas stream in conduit 422.

As noted above, the adsorbent bed units 406 may represent two or more adsorbent bed units, which may each perform a specific sequence of steps as part of the respective cycles. These adsorbent bed units may be used together to manage the flow of fluids in the various streams in the process. These steps may include an adsorption step followed by one or more blowdown steps, one or more heating steps and one or more purge steps and, optionally, one or more repressurization steps. For example, the cycle may have a duration of 90 seconds and involve the following steps: a first hold step for 0.25 seconds, a first blowdown step for 7 seconds, a second hold step for 0.25 seconds, a second blowdown step for 7 seconds, a third hold step for 0.25 seconds, a heating step for 36 seconds, a purge step for 18 seconds, a fourth hold step for 0.25 seconds, a repressurization step for 3 seconds, and an adsorption step for 18 seconds. As may be appreciated, the cycle times may be selected in such a configuration that the purge step, heating step and adsorption step are continuous. In such configurations, two adsorbent bed units are performing the heating step, one adsorbent bed unit is performing the adsorption step, one adsorbent bed unit is performing a purge step and one adsorbent bed unit is performing a repressurization step, a blow down step or a hold between steps.

As an example, the process may involve the adsorbent bed unit 406 representing the use of five adsorbent bed units and containing a total of 1365 kilograms (kg) of zeolite 4A as an adsorbent material, which is distributed as coatings on structured thin walled metal monoliths. In this example, the typical heat capacity of the adsorber bed was 2.5 Joules per gram adsorbent per degree Kelvin (J/g adsorbent/K). The swing adsorption cycle may contain various steps as set forth in Table 1.

TABLE 1

| step | Sequence | Time interval (s) | Start time (s) | End time (s) | Direction relative to feed |
|---|---|---|---|---|---|
| Hold 1 | 1 | 0.25 | 0 | 0.25 | no flow |
| Blowdown 1 | 2 | 7 | 0.25 | 7.25 | co-current |
| Hold 2 | 3 | 0.25 | 7.25 | 7.5 | no flow |
| Blowdown 2 | 4 | 7 | 7.5 | 14.5 | co-current |
| Hold 3 | 5 | 0.25 | 14.5 | 14.75 | no flow |
| Loop Heating | 6 | 36 | 14.75 | 50.75 | counter |
| Hot Purge | 7 | 18 | 50.75 | 68.75 | counter |
| Hold 4 | 8 | 0.25 | 68.75 | 69 | no flow |
| Feed Repressurization | 9 | 3 | 69 | 72 | co-current |
| Feed | 10 | 18 | 72 | 90 | co-current |
| total cycle time | | 90 | | | |

As shown in Table 1, four hold steps are utilized, which are both the front and back ends the adsorbent beds are simultaneously closed to ensure full closure of the entry and exit valves prior to the following a subsequent step. The direction of flow of each step is indicated relative to the direction of flow of the streams during the feed adsorption step. A total cycle of 90 seconds is utilized for each adsorbent bed, with the five adsorbent beds each cycling at different steps to provide near continuous flow of the streams.

In this example, the overall flow rates, pressures and temperatures of the various streams is described in Table 2, as well as the identification of the various streams relative to the diagram shown in FIG. 4. It should be noted that the indicated pressures are the final pressures (e.g., the pressure of a stream at the end of each step). Thus, for example, the purge stream may enter unit 406 at 6 bara, experience pressure drop across the adsorbent bed, and exit the unit at 5 bara as indicated. The temperatures shown for the Feed, Hot Purge, and Loop Heating steps are the initial temperatures of those streams, whereas the temperatures shown for the Product and the two Blowdown steps are the average gas temperatures. For the fuel stream, the temperature indicated is temperature of the combined purge and hot loop streams as contained in storage unit 411. The BD1 and BD2 streams may be compressed to be provided to the heat exchanger 312.

TABLE 2

Stream Conditions and Flows Summary Total Unit

| Stream | Stream as shown in FIG. 4 | Flowrate (MSCFD) | Pressure (bara)* | Ave. Temp. (F.) |
|---|---|---|---|---|
| Feed | from unit 404 | 759.6 | 66.2 | 77 |
| Product | to unit 312 | 715.6 | 64.9 | 285 |
| BD1 | to unit 312 | 19.5 | 20 | 129 |
| BD2 | to unit 312 | 6.6 | 5 | 126 |
| Purge | from unit 318 plus stream 408 | 71.3 | 5 | 400 |
| Fuel | to unit 416 | 86.5 | 5 | 92 |
| Loop | stream 410 loop | 420.1 | 5 | 430 |

The compositions of the various streams in this example are detailed in Table 3. As shown, the feed contains significant $CO_2$ and $C_2^+$ heavy hydrocarbons, as well as trace levels of $N_2$ and $H_2S$. It has been assumed that the preceding molecular sieve unit has reduced water levels in the feed to 0.1 ppm, as shown in Table 3. It may further be seen that the $CO_2$ concentration is reduced in unit 406 from a feed value of 20,000 ppm (e.g., 2%) to significantly less than 50 ppm, as is desirable for feed into an LNG plant. $H_2S$ levels are also significantly reduced. The removed $CO_2$ is concentrated and removed from the unit 406 system in the fuel stream.

TABLE 3

Stream Composition Summary Total Unit

| Stream | Stream as shown in FIG. 4 | CO2 ppm | CH4 mol frac | N2 mol frac | H2S ppm | H2O ppm | C2+ mol frac |
|---|---|---|---|---|---|---|---|
| Feed | from unit 404 | 20000 | 0.854 | 0.010 | 16.0 | 0.100 | 0.116 |
| Product | to unit 312 | 2.1 | 0.874 | 0.011 | 0.87 | 0.013 | 0.115 |
| BD1 | to unit 312 | 1.7 | 0.872 | 0.010 | 1.68 | 0.000 | 0.117 |
| BD2 | to unit 312 | 2.4 | 0.866 | 0.010 | 1.82 | 0.000 | 0.124 |
| Purge | from unit 318 plus stream 408 | 1.0 | 0.900 | 0.100 | 0.000 | 0.000 | 0.000 |
| Fuel | to unit 416 | 173888 | 0.722 | 0.077 | 131 | 0.536 | 0.027 |
| Loop | stream 410 loop | 173882 | 0.722 | 0.077 | 131 | 0.541 | 0.027 |

As an alternative embodiment of the system 400, the filter unit 402 may be utilized in different locations. For example, the filter unit 402 may be disposed upstream of the molecular sieve dehydration unit 404. In yet another configuration, a filter unit may be disposed upstream of the molecular sieve dehydration unit 404 and downstream of the molecular sieve dehydration unit 404 (e.g., in flow communication with the molecular sieve dehydration unit 404). In yet another configuration, the purge stream may bypass storage tank 411 and go directly to unit 416.

Figure 5A:
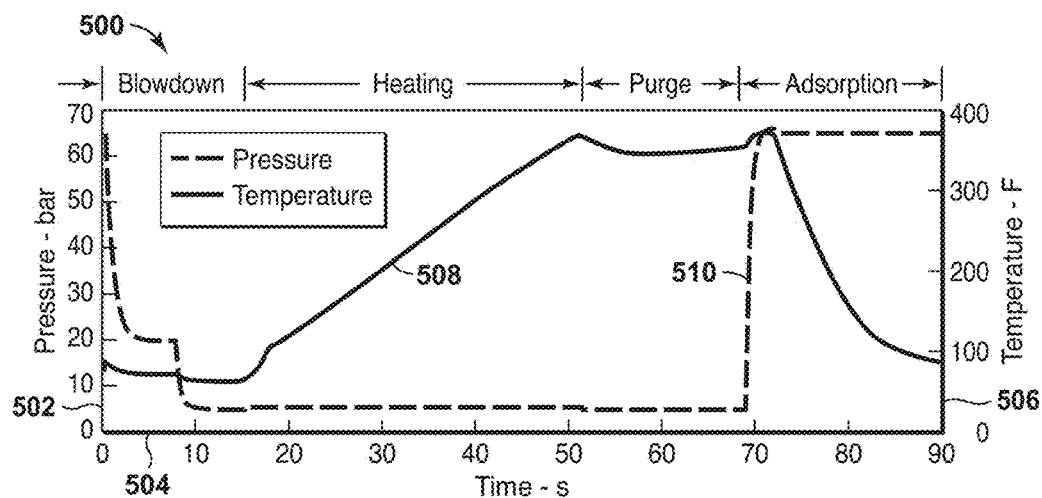
FIGS. 5A, 5B, 5C, 5D and 5E are exemplary diagrams associated with the configuration in FIG. 4 in accordance with an embodiment of the present techniques.

FIGS. 5A, 5B, 5C, 5D and 5E are exemplary diagrams 500, 520, 540, 560 and 580 associated with the configuration in FIG. 4 in accordance with an embodiment of the present techniques. These diagrams 500, 520, 540, 560 and 580 further describe different properties associated with the adsorbent bed in the adsorbent bed unit 406 of FIG. 4 and the timing of the steps in an exemplary cycle of the swing adsorption process. In particular, FIG. 5A is a diagram 500 of a temperature response 508 and a pressure response 510 for various steps in a cycle. FIGS. 5B, 5C, 4D and 5E are respective diagrams 520, 540, 560 and 580 illustrating the adsorption water ($H_2O$) content, adsorption carbon dioxide ($CO_2$) content and temperature responses along the normalized bed length for different time and different steps in the cycle of diagram 500.

FIG. 5A is a diagram 500 of a pressure response 510 shown along a pressure axis 502 in bars with respect to a time axis 504 in seconds (s) and a temperature response 508 shown along a temperature axis 506 in degrees Fahrenheit (° F.) with respect to the time axis 504. In this diagram, the responses 508 and 510 are shown for different steps in the cycle. The exemplary cycle for the adsorbent bed unit 406 may include performing an adsorption step and a regeneration step, with the regeneration step including a blowdown step, a heating step and a purge step. In particular, the blowdown step is the time period from zero seconds to fourteen seconds, the heating step is from fourteen seconds to fifty-one seconds, the purge step is from fifty-one seconds to sixty-eight seconds and the adsorption step is from sixty-eight seconds to ninety seconds. As shown by the temperature response 508 during the cycle, the temperature increases from the feed temperature of about 85° F. (29.4° C.) during the heating step to a heating temperature of about 385° F. (196.1° C.), which is about the temperature that the purge step is performed, and decreases during the adsorption step to the feed temperature of about 85° F. (29.4° C.). Similarly, the pressure response 510 during the cycle increases during the adsorption step to the feed pressure and decreases in the regenerations steps to the purge pressure.

Figure 5B:
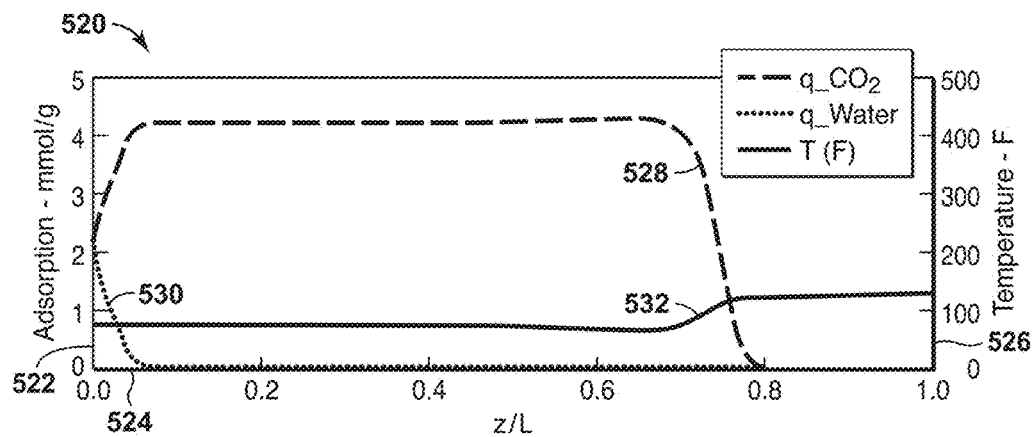

FIG. 5B is a diagram 520 of $CO_2$ adsorption response 528, water adsorption response 530, and temperature response 532 shown along the bed length at time of 0 seconds into the cycle (e.g., at the end of the adsorption step and prior to the blowdown step). In this diagram 520, the $CO_2$ adsorption response 528 and water adsorption response 530 are shown along an adsorption axis 522 in millimoles per gram (mmol/g) with respect to the bed length axis 524 in normalized bed length (z/L) and the temperature response 532 shown along a temperature axis 526 in ° F. with respect to the bed length axis 524. As shown by the $CO_2$ adsorption response 528, the product region near the product end of the adsorbent bed (e.g., portion of the adsorbent bed from greater than 0.8 of the normalized bed length) does not appears to have adsorbed $CO_2$, while the adsorbed water is limited to the feed region near the feed end (e.g., portion of the adsorbent bed from less than 0.1 of the normalized bed length). Further, the temperature along the normalized length of the adsorbent bed appears to vary from 85° F. (29.4° C.) to 105° F. (40.6° C.).

Figure 5C:
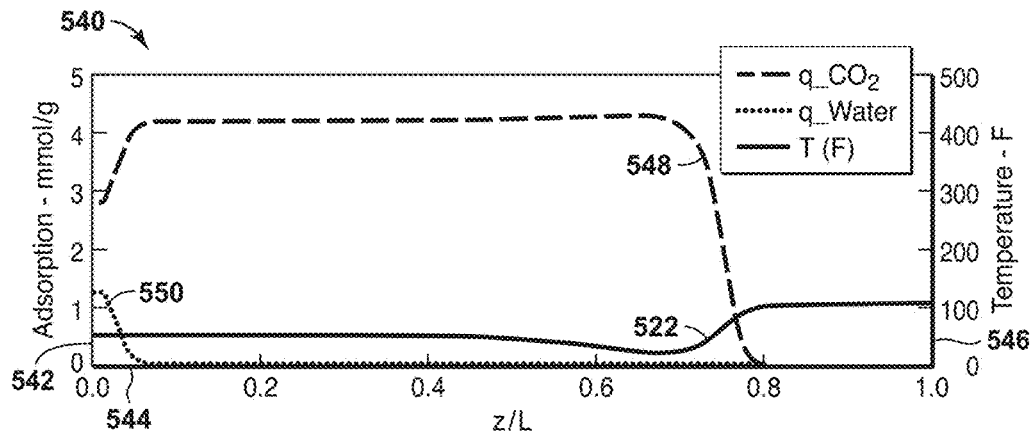

FIG. 5C is a diagram 540 of $CO_2$ adsorption response 548, water adsorption response 550, and temperature response 552 shown along the bed length at time of 14.5 seconds into the cycle (e.g., at the end of the blowdown step and the beginning of the heating step). In this diagram 540, the $CO_2$ adsorption response 548 and water adsorption response 550 are shown along an adsorption axis 542 in mmol/g with respect to the bed length axis 544 in z/L and the temperature response 552 shown along a temperature axis 546 in ° F. with respect to the bed length axis 544. As shown by the $CO_2$ adsorption response 548, the product region near the product end of the adsorbent bed (e.g., portion of the adsorbent bed from greater than 0.8 of the normalized bed length) does not appears to have adsorbed $CO_2$, while the adsorbed water is limited to the feed region near the feed end (e.g., portion of the adsorbent bed from less than 0.1 of the normalized bed length). Further, the temperature along the normalized length of the adsorbent bed appears to vary from 35° F. (1.7° C.) to 105° F. (40.6° C.).

Figure 5D:
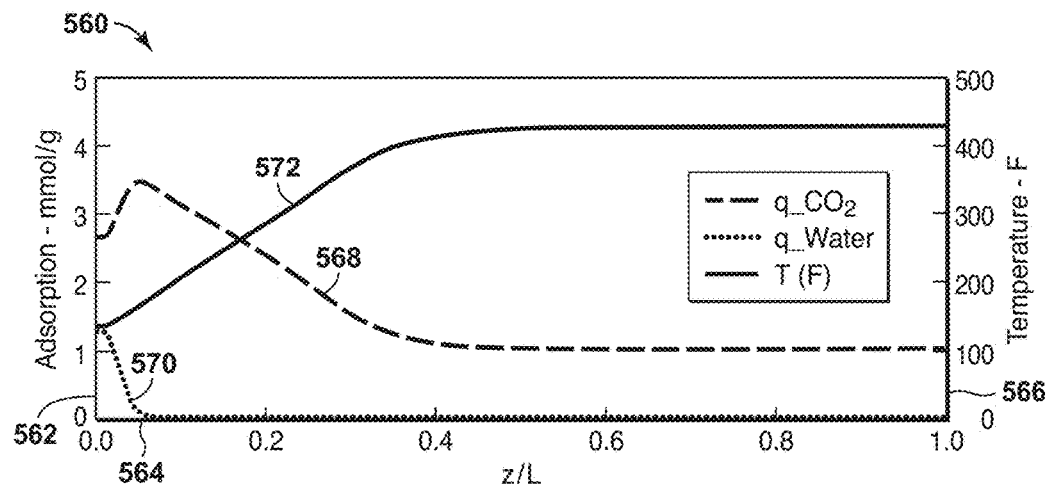

FIG. 5D is a diagram 560 of $CO_2$ adsorption response 568, water adsorption response 570, and temperature response 572 shown along the bed length at time of 50.75 seconds into the cycle (e.g., at the end of the heating step and the beginning of the purge step). In this diagram 560, the $CO_2$ adsorption response 568 and water adsorption response 570 are shown along an adsorption axis 562 in mmol/g with respect to the bed length axis 564 in z/L and the temperature response 572 shown along a temperature axis 566 in ° F. with respect to the bed length axis 564. As shown by the $CO_2$ adsorption response 568, the adsorbed $CO_2$ appears to be higher in the feed region of the adsorbent bed (e.g., portion of the adsorbent bed from less than 0.4 of the normalized bed length), while the adsorbed water is limited to the feed region near the feed end (e.g., portion of the adsorbent bed from less than 0.1 of the normalized bed length). The heating step appears to have increased the amount of adsorbed $CO_2$ over the entire length of the adsorbent bed. Further, the temperature along the normalized length of the adsorbent bed appears to be vary from 105° F. (40.6° C.) to 410° F. (210° C.), which is based on the position in the adsorbent bed.

From this diagram 560, the temperature response 572 indicates that the heating step does not raise the temperature of the entire adsorbent bed to the same temperature. The product end of the adsorbent bed is at a temperature of about 410° F. (210° C.) and the feed end of the adsorbent bed is at a temperature of about 105° F. (40.6° C.). The resulting temperature differential between the feed end and the product end of the adsorbent bed is about 305° F. (169.4° C.) (e.g., 410° F. minus 105° F. (210° C. minus 40.6° C.)). The heating feed region is from the feed end of the adsorbent bed to 0.05 of the normalized bed length, the heating product region is from the product end of the adsorbent bed to 0.4 of the normalized bed length and the heating front region is from 0.05 of the normalized bed length to the 0.4 of the normalized bed length.

Figure 5E:
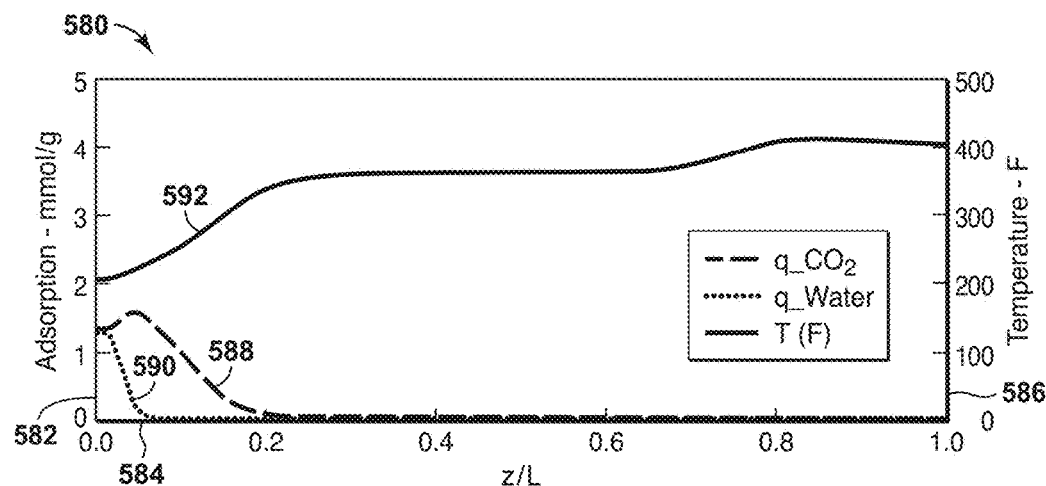

FIG. 5E is a diagram 580 of $CO_2$ adsorption response 588, water adsorption response 590, and temperature response 592 shown along the bed length at time of 68.75 seconds into the cycle (e.g., at the end of the purge step and the beginning of the adsorption step). In this diagram 580, the $CO_2$ adsorption response 588 and water adsorption response 590 are shown along an adsorption axis 582 in mmol/g with respect to the bed length axis 584 in z/L and the temperature response 592 shown along a temperature axis 586 in ° F. with respect to the bed length axis 584. As shown by the $CO_2$ adsorption response 588, the adsorbed $CO_2$ appears to be higher in the feed region of the adsorbent bed (e.g., portion of the adsorbent bed from less than 0.2 of the normalized bed length), while the adsorbed water is limited to the feed region near the feed end (e.g., portion of the adsorbent bed from less than 0.1 of the normalized bed length). Further, the temperature along the normalized length of the adsorbent bed appears to be vary from 210° F. (98.9° C.) to 405° F. (207.2° C.).

Figure 6A:
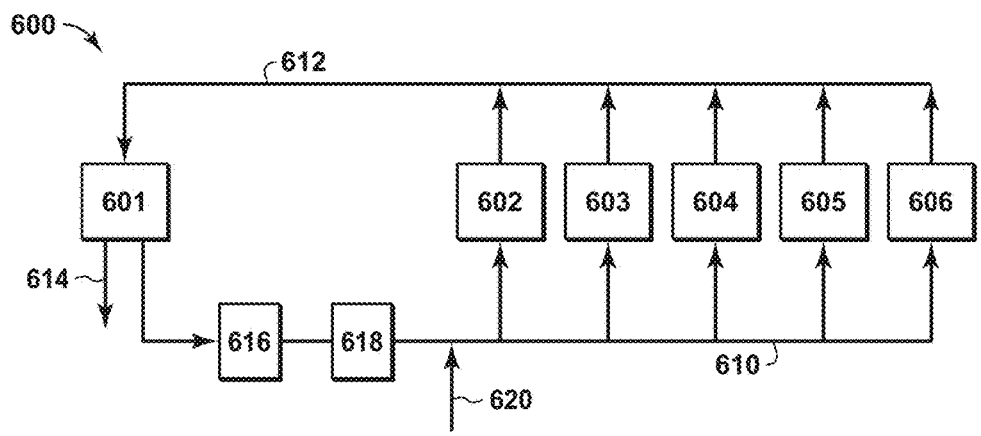
FIGS. 6A, 6B and 6C are exemplary diagrams associated with a heating loop and associated adsorbent bed units in accordance with an embodiment of the present techniques.

FIG. 6A is an exemplary diagram of a heating system 600 forming a heating loop and associated adsorbent bed units 602, 603, 604, 605, and 606 in accordance with an embodiment of the present techniques. This heating loop may be used to heat the adsorbent beds within the respective adsorbent bed units 602, 603, 604, 605, and 606. During this cycle, one or more of the adsorbent bed units 602, 603, 604, 605, and 606 may be provided the heating stream, which is at a heating temperature and a heating pressure.

To operate, the heating loop may include a storage tank 601, heating unit 618 and blower 616, which are connected together with conduits and manifolds, such as conduits 610 and 612 to provide a fluid flow path through the adsorbent bed units 602, 603, 604, 605, and 606. The storage tank 601 may be a storage vessel that has a housing forming an interior region. The storage tank 601 may be configured to receive heating fluid from the adsorbent bed unit, to contain a volume of the heating fluid for the heating stream, to provide heating fluid to the heating unit 618 and provide a portion of the heating fluid for fuel gas via conduit 614. The heating unit 618 may be a furnace and/or a heat exchanger, which is configured to receive the heating stream from the storage tank 601, to heat the heating fluid, such that the heating fluid may be provided to the respective adsorbent bed units 602, 603, 604, 605, and 606 at the heating temperature; and output the heating stream to the blower 616. The blower 616 may be a compressor or other component that may convey the heating stream through the adsorbent bed units. The blower may be configured to increase the pressure of the heating stream, such that the heating stream may utilize pressure differentials to pass through adsorbent bed units 602, 603, 604, 605, and 606.

During the heating step, the heating stream is passed from the storage tank 601 to the heating unit 618 to increase the temperature of the heating stream. Then, the heated stream is passed from the heating unit 618 to the blower 616, which is configured to increase the pressure of the heating stream. From the blower 616, the heating stream passes through the conduit 610 to one or more of the adsorbent bed units 602, 603, 604, 605, and 606 at the heating temperature. From the respective adsorbent bed units 602, 603, 604, 605, and 606, the stream is provided to the storage tank 601 via conduit 612.

During the heating step, the heating stream is passed from the storage tank 601 to the heating unit 618 to increase the temperature of the heating stream. Then, the heated stream is passed from the heating unit 618 to the blower 616, which is configured to increase the pressure of the heating stream. From the blower 616, the heating stream passes through the conduit 610 and is combined with the purge stream via conduit 620 prior to being provided to one or more of the adsorbent bed units 602, 603, 604, 605, and 606 at the heating temperature. From the respective adsorbent bed units 602, 603, 604, 605, and 606, the stream is provided to the storage tank 601 via conduit 612. To maintain the mass balance in the heating loop, a portion of the stream from the adsorbent bed units 602, 603, 604, 605, and 606 is passed to fuel sales.

In an alternative configuration, the heating step may involve heating a portion of the adsorbent bed within the adsorbent bed unit. For example, the portion of the adsorbent bed that is heated may be from the product end of the adsorbent bed to 80% of the bed length, from the product end of the adsorbent bed to 60% of the bed length or from the product end of the adsorbent bed to 40% of the bed length. In this configuration, an electrical heating unit may be used to heat the metal substrate in the adsorbent bed or the specific portion of the adsorbent bed that is to be heated may be heated by a heating stream. In the later configuration, the adsorbent bed may include a gap or break in the adsorbent bed unit at the desired location (heating location) along the adsorbent bed's length. One or more valves may be used to introduce the heating stream to the adsorbent bed at the heating location and pass the heating stream from the heating location to the product end of the adsorbent bed.

While feed streams having $CO_2$ content may be in the range 20,000 ppm and 5,000 ppm, a separate heating loop and heating step may be involved in the form of the heating loop, as noted above. However, at low $CO_2$ concentrations, the configuration may involve a modified heating loop that is a double purge configuration. This configuration may be useful for feed streams having low $CO_2$ concentrations of less than 2,000 ppm or less than 400 ppm, for example. By way of example, the gaseous feed stream may include hydrocarbons and $CO_2$, wherein the $CO_2$ content is in the range of one hundred parts per million volume and less than or equal to about 5 molar % of the gaseous feed stream or in the range of two hundred parts per million volume and less than or equal to about 2 molar % of the gaseous feed stream. The heating step may also provide some additional purge by removing one or more contaminants from the adsorbent bed.

Figure 6B:
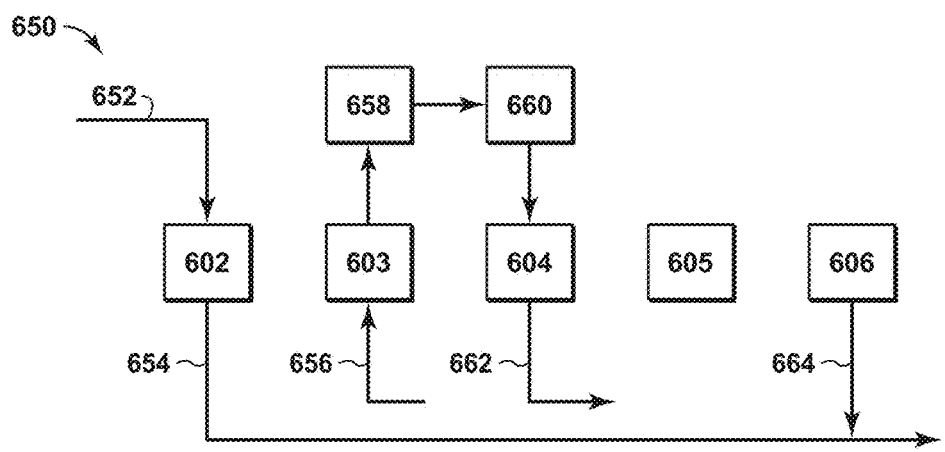

FIG. 6B is another exemplary diagram of a heating system 650 having a modified heating loop that provides a dual purge configuration for the associated adsorbent bed units 602, 603, 604, 605, and 606 in accordance with an embodiment of the present techniques. The modified heating loop may be used to heat and purge the adsorbent beds within the respective adsorbent bed units 602, 603, 604, 605, and 606 in different steps in a cycle.

The modified heating loop may include performing a dual purge with different variations for the process. For example, the process may one or more blowdown steps, two or more purge steps (e.g., may be referred to as the heating step or used to heat the adsorbent beds), and a repressurize step. A specific example is shown with reference to FIG. 6B. In this diagram 650, the adsorbent bed units 602, 603, 604, 605, and 606 are performing the different steps in a cycle. The adsorbent bed unit 602 is performing an adsorption step that involves passing the feed stream from a conduit 652 through the adsorbent bed in adsorbent bed unit 602 to the conduit 654. The operation of this step may be similar to the previous process as noted above. The performance of the blowdown step is shown by adsorbent bed unit 606, which has the blowdown stream passed into the conduit 664 and then mixed with the stream in conduit 654. Then, a heating step may be performed with the purge stream. For this dual purge configuration, the purge stream is through a first adsorbent bed as a final purge step and then through a second adsorbent bed as an initial purge step. This dual purge is shown as the purge stream is passed through adsorbent bed unit 603 from conduit 656 and to compressor unit 658 and then the compressed stream is passed to a heating unit 660 prior to passing to the second adsorbent bed in adsorbent bed unit 604, then to a conduit 662. The heating with heated recycled purge stream, which is the initial purge stream, is sourced from the outlet purge stream of another adsorbent bed, such as adsorbent bed unit 603 and contains the $CO_2$ removed from the previous adsorbent bed. The stream may or may not be compressed to a higher pressure and/or heated (e.g., may bypass the compressor unit 658 and the heating unit 660). Also, if additional heat is necessary, the stream may be recycled or additional heating units may be utilized within the purge stream. The final purge stream (e.g., the clean methane stream from the LNG flash gas similar to the purge step in the process above of FIG. 4) may include small amounts or no $CO_2$. The adsorbent bed unit 605 may be in a hold step. While not shown, one additional step may be the repressurize step that is involved in placing the adsorbent bed into service or the adsorbent step. Further, in certain embodiments, the purge product stream may recycled or may be used as a purge stream for another adsorbent bed. The temperature of the heating loop leaving the adsorbent bed is lower than the heating loop inlet temperature by at least 50° F. (27.8° C.).

Figure 6C:
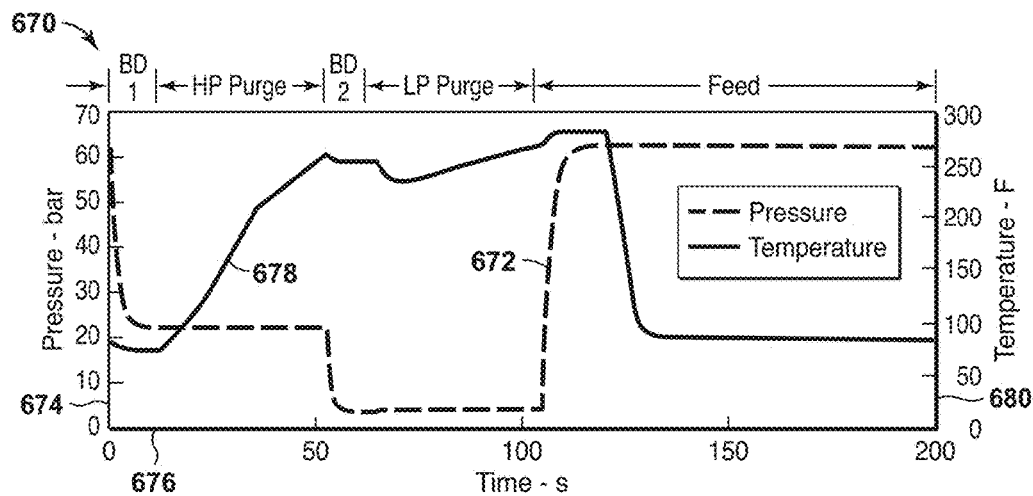

FIG. 6C is a diagram 670 of a pressure response 672 shown along a pressure axis 674 in bars with respect to a time axis 676 in seconds (s) and a temperature response 678 shown along a temperature axis 680 in degrees Fahrenheit (° F.) with respect to the time axis 676. In this diagram, the responses 672 and 678 are shown for different steps in the cycle. The exemplary cycle for the adsorbent bed unit, which may be one of the adsorbent bed units 602, 603, 604, 605, and 606 of FIG. 6B, may include performing an adsorption step and a regeneration step, with the regeneration step including a first blowdown step, a first purge step, a second blowdown step and a second purge step, which are performed in a cycle having a duration of 200 seconds.

This cycle is for a feed stream with 2,000 ppm $CO_2$. For these lower $CO_2$ concentrations, the adsorption step may be performed for longer durations due to more adsorbent capacity due to less $CO_2$ to adsorb. As this configuration is for multiple adsorbent bed units, two adsorbent bed units may be receiving the feed stream at the same time. The longer adsorption steps may result in less frequent heating of the adsorbent bed units, which also results in less heating gas as a percentage of feed. In the dual purge configuration, each adsorbent bed unit is subjected to two purge steps, which are a high pressure purge step and a low pressure purge step. The high pressure purge stream for the high pressure purge step is obtained from the outlet purge stream (e.g., vent gas) of the lower pressure purge step, so the high pressure purge stream is performed with "dirty" gas which may contain about 4 molar % $CO_2$. The high pressure purge step is utilized to heat the adsorbent bed. After the high pressure purge step, the pressure in the adsorbent bed is decreased further and subjected to the low pressure "clean" purge which comes from LNG flash and/or BOG gas. The low pressure purge regenerates the adsorbent bed as the final purge stream. Beneficially, the dual purge configuration may not involve additional heaters or compressors.

FIG. 7 is another exemplary diagram of a system 700 for treating of a feed stream to form a liquefied natural gas (LNG) stream in accordance with an embodiment of the present techniques. In this system 700, the pipeline gas stream may be dehydrated using an adsorbent bed unit for the dehydration, such as dehydration adsorbent bed unit 702, which is in fluid communication with the adsorbent bed unit 406, which is configured to remove a portion of the $CO_2$. The adsorbent bed units 702 and 406 may be used to perform rapid cycle swing adsorption processes, which may involve passing various streams through the adsorbent bed units 702 and 406. As part of this process, a heating step via a heating loop 410 may be used along with a purge step to remove contaminants from the adsorbent beds within the respective adsorbent bed units 406 and 702. As may be appreciated, the dehydration adsorbent bed unit 702 and adsorbent bed unit 406 may include multiple units to perform the processes in the respective units. Further, the dehydration adsorbent bed unit 702 and adsorbent bed unit 406 may each operate with different cycles, which involve adsorption steps and regenerations steps in the respective cycles. Also, as certain equipment or units are similar to those in FIGS. 3 and 4, the equipment and units are referenced by the same reference character in this system 700.

In this system, the process begins at a mercury removal unit 302, which receives an input stream and separates mercury from the input stream. The output stream from the mercury removal unit 302 is provided via conduit 304 to a filter unit 402, which is configured to remove any particular matter from the stream. The output stream from the filter unit 402 is the feed stream to the dehydration adsorbent bed unit 702, during its adsorption step. The dehydration adsorbent bed unit 702 includes a housing having an adsorbent material disposed within the housing, which may be one of the adsorbent bed units noted above in FIGS. 1 and 2. During the adsorption step, the dehydration adsorbent bed unit 702 is configured to lower the water content of the stream to less than 0.1 ppm water by adsorbing the water from the stream into the adsorbent material and passing the remaining portion of the stream out of the adsorbent material and the unit. The dehydrated stream from the dehydration adsorbent bed unit 702 is provided to the swing adsorbent bed unit 406 during its adsorption step, which may be handled in a manner similar as noted above in the discussion of FIG. 4. Following the removal of contaminants in units 402, 702 and 406, the LNG feed stream is subjected to LNG processing in the heat exchanger 312, LNG processing unit 314 and fuel gas compressor unit 318 in manner similar to the discussion of FIG. 4 above. The processing results, in a liquefied natural gas stream, are provided via conduit 316 and a flash fuel stream is provided to the fuel gas compressor unit 318.

In this configuration, the system 700 includes a purge step that is combined with a heating step as part of the regeneration step in the cycle for the adsorbent bed unit 406. The purge stream is formed from the output from the fuel gas compressor unit 318, which may be combined with a boil off gas stream from conduit 408 and passed to the adsorbent bed unit 406 during the purge step of the cycle as the purge gas. The heating stream is formed as a portion of the output stream from the adsorbent bed unit 406 is separated into heating loop 410, which passes through a storage unit 411, a heating unit 412 and a blower 414, which operate in a manner similar to that described in FIG. 4 above. The remaining portion of the stream from the adsorbent bed unit 406 and the heated portion that is passed through and outputted from the adsorbent bed unit 406 are combined and passed to the conditioning unit 704. The conditioning unit 704 may be used to heat the combined stream for regeneration of the dehydration adsorbent bed unit 702 and may also be utilized to increase the pressure of the combined stream. In particular, the conditioning unit 704 may be a heat exchanger or a furnace coupled with a compressor (e.g., a standalone compressor or one stage in the fuel gas compressor unit 318). The output from the conditioning unit 704 is passed to the dehydration adsorbent bed unit 702 for its regeneration step. The stream heats the adsorbent bed of the dehydration adsorbent bed unit 702 to remove water from the adsorbent bed. The output stream from the dehydration adsorbent bed unit 702 during the purge step exits dehydration adsorbent bed unit 702 and is passed to the heat exchanger unit 418. The heat exchanger unit 418 adjusts the temperature of the stream and the resulting stream may be provided as the process fuel gas stream in conduit 422.

FIG. 7 is yet another exemplary diagram of a system 800 for treating of a feed stream to form a liquefied natural gas (LNG) stream in accordance with an embodiment of the present techniques. In this system 800, an integrated rapid cycle swing adsorption process is used to dehydrate and remove $CO_2$ from the pipeline gas stream to form a stream that complies with LNG specifications. In particular, the input stream (e.g., pipeline gas stream) may be dehydrated and have the $CO_2$ removed by using an adsorbent bed unit 802. The adsorbent bed unit 802 may be used to perform a rapid cycle swing adsorption processes, which may involve passing various streams through the adsorbent bed unit 802. As part of this process, a heating step via a heating loop 410 may be used along with a purge step to remove contaminants from the adsorbent bed within the adsorbent bed unit 802. As may be appreciated, the adsorbent bed unit 802 may include multiple units to perform the processes. Further, the adsorbent bed unit 802 may operate with a cycle, which involve adsorption steps and regenerations steps. Also, as certain equipment or units are similar to those in FIGS. 3 and 4, the equipment and units are referenced by the same reference character in this system 800.

In this system, the process begins at a mercury removal unit 302, which receives an input stream and separates mercury from the input stream, and filter unit 402, which receives the stream via conduit 304 and is configured to remove any particular matter from the stream. The output stream from the filter unit 402 is the feed stream to the adsorbent bed unit 802, during its adsorption step. The adsorbent bed unit 802 includes a housing having an adsorbent material disposed within the housing, which may be one of the adsorbent bed units noted above in FIGS. 1 and 2. The adsorbent bed may include an adsorbent material that is configured to have a higher selectivity to water and $CO_2$ and/or may include two or more adsorbent materials, with each having a higher selectivity to water or $CO_2$. During the adsorption step, the adsorbent bed unit 802 is configured to lower the water content of the stream to less than 0.1 ppm water by adsorbing the water from the stream into the adsorbent bed; to lower the $CO_2$ content of the stream to less than 50 ppm by adsorbing the $CO_2$ from the stream into the adsorbent bed; and to pass the remaining portion of the stream out of the adsorbent bed and the unit. The decontaminated stream from the adsorbent bed unit 802 is provided as the LNG feed stream to the heat exchanger 312, LNG processing unit 314 and fuel gas compressor unit 318, which may operate in manner similar to the discussion of FIG. 4 above. The processing results, in a liquefied natural gas stream are provided via conduit 316 and a flash fuel stream is provided to the fuel gas compressor unit 318.

In this configuration, the system 800 includes a purge step that is combined with a heating step as part of the regeneration step in the cycle for the adsorbent bed unit 802. The purge stream is formed from the output from the fuel gas compressor unit 318, which may be combined with a boil off gas stream from conduit 408 and passed to the adsorbent bed unit 802 during the purge step of the cycle as the purge gas. The heating stream is formed as a portion of the output stream from the adsorbent bed unit 802 is separated into the heating loop 410, which passes through a storage unit 411, a heating unit 412 and a blower 414, which operate in a manner similar to that described in FIG. 4 above. The remaining portion of the stream from the adsorbent bed unit 802 and the heated portion that is passed through and outputted from the adsorbent bed unit 802 are combined and passed to the heat exchanger unit 418. The heat exchanger unit 418 adjusts the temperature of the stream and the resulting stream may be provided as the process fuel gas stream in conduit 422.

In one or more embodiments, the material may include an adsorbent material supported on a non-adsorbent support. The adsorbent materials may include alumina, microporous zeolites, carbons, cationic zeolites, high silica zeolites, highly siliceous ordered mesoporous materials, sol gel materials, aluminum phosphorous and oxygen (ALPO) materials (microporous and mesoporous materials containing predominantly aluminum phosphorous and oxygen), silicon aluminum phosphorous and oxygen (SAPO) materials (microporous and mesoporous materials containing predominantly silicon aluminum phosphorous and oxygen), metal organic framework (MOF) materials (microporous and mesoporous materials comprised of a metal organic framework) and zeolitic imidazolate frameworks (ZIF) materials (microporous and mesoporous materials comprised of zeolitic imidazolate frameworks). Other materials include microporous and mesoporous sorbents functionalized with functional groups. Examples of functional groups include primary, secondary, tertiary amines and other non protogenic basic groups such as amidines, guanidines and biguanides.

In one or more embodiments, the adsorbent bed unit may be utilized to separate contaminants from a feed stream. The method may include passing a gaseous feed stream at a feed pressure through an adsorbent bed unit having an adsorbent contactor to separate one or more contaminants from the gaseous feed stream to form a product stream, wherein the adsorbent contactor has a first portion and a second portion; interrupting the flow of the gaseous feed stream; performing a depressurization step, wherein the depressurization step reduces the pressure within the adsorbent bed unit; performing a heating step, wherein the heating step increases the temperature of the adsorbent bed unit to form a temperature differential between the feed end of the adsorbent bed and the product end of the adsorbent bed; and performing a purge step, wherein the purge step reduces the pressure within the adsorbent bed unit; performing a re-pressurization step, wherein the re-pressurization step increases the pressure within the adsorbent bed unit; and repeating the steps a) to e) for at least one additional cycle.

Further, in one or more embodiments, the adsorbent bed unit may include an adsorbent bed that can be used for the separation of a target gas form a gaseous mixture. The adsorbent is usually comprised of an adsorbent material supported on a non-adsorbent support, or contactor. Such contactors contain substantially parallel flow channels wherein 20 volume percent, preferably 15 volume percent or less of the open pore volume of the contactor, excluding the flow channels, is in pores greater than about 20 angstroms. A flow channel is taken to be that portion of the contactor in which gas flows, if a steady state pressure difference is applied between the point or place at which a feed stream enters the contactor and the point or place at which a product stream leaves the contactor. In the contactor, the adsorbent is incorporated into the wall of the flow channel.

In one or more embodiments, when using RCTSA the total cycle times are typically less than 600 seconds, preferably less than 180 seconds, more preferably less than 90 seconds, and even more preferably less than 60 seconds. In other embodiments, the rapid cycle swing adsorption process may have a total cycle times less than 600 seconds, preferably less than 180 seconds, more preferably less than 90 seconds, and even more preferably less than 60 seconds.

In view of the many possible embodiments to which the principles of the disclosed invention may be applied, it should be recognized that the illustrative embodiments are only preferred examples of the invention and should not be taken as limiting the scope of the invention.

What is claimed is:

1. A process for removing contaminants from a gaseous feed stream, the process comprising:
   a) performing one or more adsorption steps, wherein each of the one or more adsorption steps comprise passing a gaseous feed stream through an adsorbent bed unit having an adsorbent bed to separate one or more contaminants from the gaseous feed stream to form a product stream;
   b) performing one or more depressurization steps, wherein the pressure within the adsorbent bed unit is reduced by a predetermined amount with each successive depressurization step;
   c) performing a heating step, wherein the heating step comprises passing a heating stream at a heating temperature into the adsorbent bed unit, wherein the heating stream is passed in a countercurrent direction relative to the direction of the feed stream and the heating temperature is less than 500° F. (260° C.);
   d) performing purge step, wherein the purge step comprises passing a purge stream into the adsorbent bed unit, wherein the purge stream is passed in a countercurrent direction relative to the direction of the feed stream and wherein a temperature differential exists at the end of the purge step in a range between 50° F. (27.8° C.) and 400° F. (222.2° C.), wherein the temperature differential is the difference in temperatures between a feed end of the adsorbent bed and a product end of the adsorbent bed; and
   e) repeating the steps a) to d) for at least one additional cycle, wherein the cycle duration is for a period greater than 1 second and less than 600 seconds.

2. The process of claim 1, wherein the temperature differential is in a range between 125° F. (69.4° C.) and 350° F. (194.4° C.).

3. The process of claim 1, wherein the temperature differential is in a range between 175° F. (97.2° C.) and 300° F. (166.7° C.).

4. The process of claim 1, wherein the gaseous feed stream is a hydrocarbon containing stream having greater than one volume percent hydrocarbons based on the total volume of the feed stream.

5. The process of claim 1, wherein the gaseous feed stream comprises hydrocarbons and $CO_2$, wherein the $CO_2$ content is in the range of one hundred parts per million volume and less than or equal to about 5 volume % of the gaseous feed stream.

6. The process of claim 1, wherein the adsorbent bed unit is configured to lower the carbon dioxide ($CO_2$) level to less than 50 parts per million.

7. The process of claim 1, wherein the gaseous feed stream is provided at a feed pressure in the range between 50 bar absolute (bara) and 150 bara and at a feed temperature in the range between −40° F. (−40° C.) and 200° F. (93.3° C.).

8. The process of claim 1, wherein passing the heating stream comprises heating a portion of the adsorbent bed from a product end of the adsorbent bed to 40% of the bed length to the within 10% of the heating temperature.

9. The process of claim 1, wherein passing the heating stream comprises heating a portion of the adsorbent bed from a. product end of the adsorbent bed to 10% of the bed length to a temperature of the difference between the heating temperature and the temperature differential.

10. The process of claim 1, further comprising:
    passing an input stream to a dehydration adsorption unit; and
    adsorbing a portion of the $H_2O$ from the input stream during an adsorption step, wherein the remaining portion of the input stream is the gaseous feed stream; and
    conducting away a portion of the $H_2O$ from the dehydration adsorption unit during a regeneration step.

11. The process of claim 1, further comprising:
    passing the product stream from the adsorbent bed unit to a liquefied natural gas process unit; and
    separating a flash fuel stream of high purity methane from the LNG process unit to be utilized as at least a portion of the purge stream.

12. The process of claim 1, wherein the cycle duration is greater than 2 seconds and less than 300 seconds.

13. The process of claim 1, wherein passing the heating stream at the heating temperature into the adsorbent bed unit further comprising recycling the heating stream through the adsorbent bed via a heating loop.

14. The process of claim 13, further comprising passing the heating stream to a heating unit to increase the temperature of the heating stream prior to passing the heating stream at the heating temperature into the adsorbent bed unit.

15. The process of claim 14, further comprising passing the heating stream from a blower to the heating unit to increase the pressure of the heating stream prior to passing the heating stream to the adsorbent bed unit.

16. The process of claim 1, comprising performing a second purge step prior to the purge step, wherein the second purge step comprises passing a second purge stream into the adsorbent bed unit to remove contaminants from the adsorbent bed unit, wherein the second purge stream is an output purge product stream from another adsorbent bed unit.

17. The process of claim 1, wherein passing the heating stream at the heating temperature into the adsorbent bed unit further comprising passing an output purge stream from another adsorbent bed unit.

18. A system for removing contaminants from a gaseous feed stream, the system comprising:
    an adsorbent bed unit configured to separate contaminants from a gaseous feed stream and to output a product stream, wherein the adsorbent bed unit comprises an adsorbent bed;
    a liquefied natural gas process unit in fluid communication with the adsorbent bed unit and configured to receive the product stream and separate the product stream into a final product stream and a flash fuel stream of high methane; and
    one or more purge units in fluid communication with the liquefied natural gas process unit and configured to provide a purge stream to the adsorbent bed unit, wherein the purge stream is provided from one of a portion of the product stream, the flash fuel stream of high purity methane, and any combination thereof;
    a heating mechanism in fluid communication with the adsorbent bed unit and configured to:
        pass a heating stream at a heating temperature into the adsorbent bed unit, wherein the heating stream is configured to create a temperature differential in a range between 50° F. (27.8° C.) and 400° F. (222.2° C.), wherein the temperature differential is the difference in temperatures between a feed end of the adsorbent bed and a product end of the adsorbent bed; and
        combine a portion of the heating stream with the purge stream that is passed through the adsorbent bed unit.

19. The system of claim 18, further comprising a dehydration adsorption unit in fluid communication with the adsorbent bed unit and configured to receive an input stream and form the gaseous feed stream, wherein the dehydration adsorption unit is configured to adsorb a portion of the $H_2O$ from the input stream during an adsorption step, wherein the remaining portion of the input stream is the gaseous feed stream; and to conduct away a portion of the $H_2O$ from the dehydration adsorption unit during a regeneration step.

20. The system of claim 19, wherein the dehydration adsorption unit is a molecular sieve adsorption unit.

21. The system of claim 19, wherein the dehydration adsorption unit is an adsorbent bed unit configured to perform a rapid cycle thermal swing adsorption process.

22. The system of claim 18, wherein the heating mechanism is a heating loop that includes a heating unit configured to heat the heating stream prior to passing the heating stream to the adsorbent bed unit.

23. The system of claim 22, wherein the heating loop includes a blower in fluid communication with the heating unit and configured to increase the pressure of the heating stream prior to passing the heating stream to the adsorbent bed unit.

24. The system of claim 18, wherein the heating mechanism comprises one or more conduits and valves configured to pass a purge product stream from a second adsorbent bed unit through the adsorbent bed unit.

25. The system of claim 18, wherein the one or more purge units comprise one or more compressors configured to compress the flash fuel stream of high purity methane.

* * * * *